(12) United States Patent
Sun et al.

(10) Patent No.: US 10,681,692 B2
(45) Date of Patent: Jun. 9, 2020

(54) TRANSMISSION RESOURCE MAPPING METHOD AND DEVICE

(71) Applicant: Huawei Technologies Co., Ltd., Shenzhen (CN)

(72) Inventors: Xiaodong Sun, Shenzhen (CN); Jian Wang, Beijing (CN); Da Wang, Shenzhen (CN); Yanliang Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 28 days.

(21) Appl. No.: 16/301,322

(22) PCT Filed: May 13, 2016

(86) PCT No.: PCT/CN2016/082121
§ 371 (c)(1),
(2) Date: Nov. 13, 2018

(87) PCT Pub. No.: WO2017/193397
PCT Pub. Date: Nov. 16, 2017

(65) Prior Publication Data
US 2019/0200335 A1   Jun. 27, 2019

(51) Int. Cl.
*H04W 72/04* (2009.01)
*H04W 84/04* (2009.01)

(52) U.S. Cl.
CPC ......... *H04W 72/044* (2013.01); *H04W 72/04* (2013.01); *H04W 72/0446* (2013.01); *H04W 84/042* (2013.01)

(58) Field of Classification Search
CPC .......... H04W 72/044; H04W 72/0446; H04W 72/04; H04W 84/042
See application file for complete search history.

(56) References Cited

U.S. PATENT DOCUMENTS

2009/0252073 A1* 10/2009 Kim ................. H04W 52/0241
                                                           370/311
2010/0111139 A1*  5/2010 Arnott .............. H04W 72/0446
                                                           375/133

(Continued)

FOREIGN PATENT DOCUMENTS

CN        1790962 A     6/2006
CN      101568180 A    10/2009

(Continued)

OTHER PUBLICATIONS

Machine Translation and Abstract of Chinese Publication No. CN1790962, dated Jun. 21, 2006, 13 pages.

(Continued)

*Primary Examiner* — Lan-Huong Truong
(74) *Attorney, Agent, or Firm* — Conley Rose, P.C.

(57) ABSTRACT

A transmission resource mapping method and a device relating to the field of mobile communications technologies, where resource mapping is performed using a resource element block, a length of the resource element block in time domain is less than a length of a physical resource block in the time domain. Therefore, a mapping granularity can be reduced during resource mapping such that latency in a transmission process can be reduced.

18 Claims, 8 Drawing Sheets

---

A terminal device receives control signaling sent by a network device, where the control signaling is used to indicate a mapping mode to be used by the terminal device to map to-be-sent data to a transmission resource, the mapping mode includes that a minimum unit for mapping the to-be-sent data is a resource element block and a frequency hopping pattern in a transmission process after the to-be-sent data is mapped to the transmission resource, and a length of the resource element block in a time domain is less than a length of a physical resource block in the time domain — 201

The terminal device maps the to-be-sent data to the transmission resource based on the indication of the control signaling and by using the resource element block as a unit — 202

(56) References Cited

U.S. PATENT DOCUMENTS

| | | | | |
|---|---|---|---|---|
| 2011/0103292 | A1* | 5/2011 | Pasad | H04B 7/155 370/315 |
| 2012/0213196 | A1* | 8/2012 | Chung | H04B 1/713 370/330 |
| 2013/0163406 | A1* | 6/2013 | Oizumi | H04L 1/0061 370/216 |
| 2014/0334478 | A1* | 11/2014 | Cheng | H04L 27/261 370/350 |
| 2014/0348123 | A1* | 11/2014 | Zhou | H04L 5/0053 370/330 |
| 2016/0219587 | A1* | 7/2016 | Lin | H04W 4/70 |
| 2016/0338088 | A1* | 11/2016 | Fakoorian | H04W 72/1263 |
| 2018/0176942 | A1* | 6/2018 | Kim | H04W 72/04 |

FOREIGN PATENT DOCUMENTS

| | | |
|---|---|---|
| CN | 104244445 A | 12/2014 |
| EP | 3010303 A1 | 4/2016 |
| WO | 2016040290 A1 | 3/2016 |
| WO | 2016043906 A1 | 3/2016 |

OTHER PUBLICATIONS

Machine Translation and Abstract of Chinese Publication No. CN101568180, dated Oct. 28, 2009, 66 pages.

Foreign Communication From a Counterpart Application, PCT Application No. PCT/CN2016/082121, English Translation of International Search Report dated Jan. 25, 2017, 2 pages.

Foreign Communication From a Counterpart Application, PCT Application No. PCT/CN2016/082121, English Translation of Written Opinion dated Jan. 25, 2017, 6 pages.

LG Electronics,"Discussion on PUSCH transmission with TTI shortening," R1-160655, 3GPP TSG RAN WG1 Meeting #84, Feb. 15-19, 2016, 8 pages.

Sharp, "Link level evaluation results of shortened TTI for PUCCH," R1-163402, 3GPP TSG RAN WG1 Meeting #84bis, Apr. 11-15, 2016, 10 pages.

LG Electronics,"Discussion on PUSCH design with TTI shortening," R1-163820, 3GPP TSG RAN WG1 Meeting #84bis, Apr. 11-15, 2016, 12 pages.

Foreign Communication From a Counterpart Application, European Application No. 16901352.1, Extended European Search Report dated Mar. 29, 2019, 11 pages.

* cited by examiner

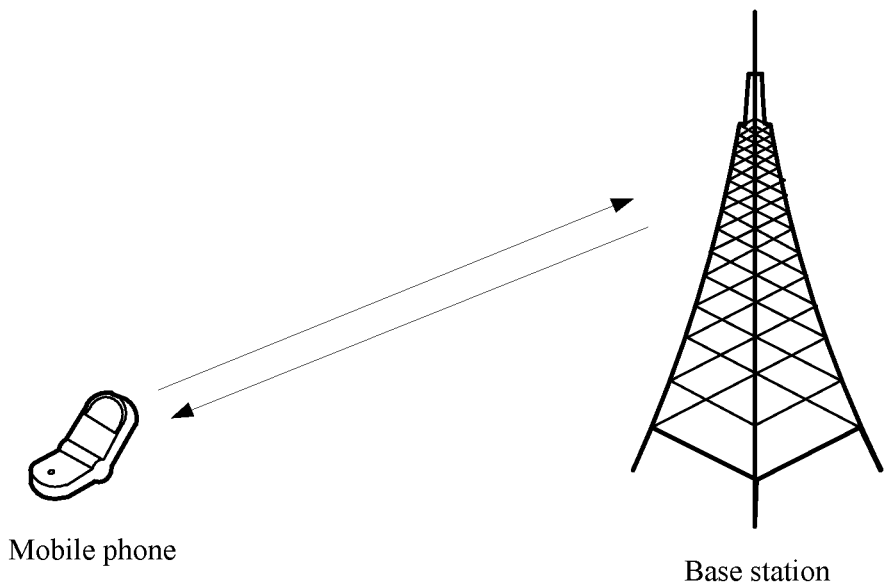

Mobile phone         Base station

FIG. 1

A terminal device receives control signaling sent by a network device, where the control signaling is used to indicate a mapping mode to be used by the terminal device to map to-be-sent data to a transmission resource, the mapping mode includes that a minimum unit for mapping the to-be-sent data is a resource element block and a frequency hopping pattern in a transmission process after the to-be-sent data is mapped to the transmission resource, and a length of the resource element block in a time domain is less than a length of a physical resource block in the time domain                201

The terminal device maps the to-be-sent data to the transmission resource based on the indication of the control signaling and by using the resource element block as a unit                202

|   |   |   |   |
|---|---|---|---|
| 7 | 7 | 7 | 7 |
| 6 | 6 | 6 | 6 |
| 5 | 5 | 5 | 5 |
| 4 | 4 | 4 | 4 |

|   |   |   |   |
|---|---|---|---|
| 7 | 7 | 7 | 7 |
| 6 | 6 | 6 | 6 |
| 5 | 5 | 5 | 5 |
| 4 | 4 | 4 | 4 |

|   |   |   |   |
|---|---|---|---|
| 3 | 3 | 3 | 3 |
| 2 | 2 | 2 | 2 |
| 1 | 1 | 1 | 1 |
| 0 | 0 | 0 | 0 |

|   |   |   |   |
|---|---|---|---|
| 3 | 3 | 3 | 3 |
| 2 | 2 | 2 | 2 |
| 1 | 1 | 1 | 1 |
| 0 | 0 | 0 | 0 |

TRANSMISSION RESOURCE MAPPING METHOD AND DEVICE

CROSS-REFERENCE TO RELATED APPLICATIONS

This application is a U.S. National Stage of International Patent Application No. PCT/CN2016/082121 filed on May 13, 2016, which is hereby incorporated by reference in its entirety.

TECHNICAL FIELD

The present invention relates to the field of mobile communications technologies, and in particular, to a transmission resource mapping method and a device.

BACKGROUND

In conventional fourth-generation (4G) mobile communications technologies, for example, a minimum unit for resource mapping on a physical uplink shared channel (Physical Uplink Shared Channel, PUSCH) is a physical resource block (Physical Resource Block, PRB). One PRB generally includes seven orthogonal frequency division multiple access (Orthogonal Frequency Division Multiple Access, OFDMA) or single carrier frequency division multiple access (Single Carrier Frequency Division Multiple Access, SC-FDMA) symbols in time domain. In a future fifth-generation (5G) mobile communications system, some services such as ultra-reliable and low latency communications (ultra Reliability Low Latency Communication, URLLC) may have a relatively high latency requirement.

In this type of application scenario, a PRB in a conventional 4G mobile communications system apparently has an excessively long span in time domain, resulting in relatively long latency. As can be learned, a resource mapping mode in an uplink in the conventional 4G mobile communications system is apparently no longer applicable to the 5G mobile communications system, and is especially not applicable to services having a relatively high latency requirement in the 5G system. No solution to this has been provided so far.

SUMMARY

Embodiments of the present invention provide a transmission resource mapping method and a device, to provide a transmission resource mapping mode in a 5G system.

According to a first aspect, a first transmission resource mapping method is provided. The method may include: receiving, by a terminal device, control signaling sent by a network device, where the control signaling is used to indicate a mapping mode to be used by the terminal device to map to-be-sent data to a transmission resource, the mapping mode includes that a minimum unit for mapping the to-be-sent data is a resource element block and a frequency hopping pattern in a transmission process after the to-be-sent data is mapped to the transmission resource, and a length of the resource element block in time domain is less than a length of a physical resource block in time domain; and mapping, by the terminal device, the to-be-sent data to the transmission resource based on the indication of the control signaling and by using the resource element block as a unit. The embodiments of the present invention provide a new transmission resource mapping mode. In this mapping mode, the terminal device may perform mapping based on the control signaling sent by the network device, the minimum unit for mapping is the resource element block, and the length of the resource element block in time domain is less than the length of the physical resource block in time domain. In this way, a granularity is relatively small during mapping, latency in the transmission process can be effectively reduced, and this mapping mode is totally applicable to a service that has a relatively high latency requirement.

With reference to the first aspect, in a first possible implementation of the first aspect, the mapping, by the terminal device, the to-be-sent data to the transmission resource based on the indication of the control signaling and by using the resource element block as a unit may be implemented in the following manner: calculating, by the terminal device, a location of a transmission resource to which the to-be-sent data is mapped at each moment in the transmission process based on the indication of the control signaling, and mapping, by the terminal device, the to-be-sent data to the transmission resource based on the calculated location of the transmission resource and by using the resource element block as the unit.

If frequency hopping needs to be performed, the terminal device may calculate the location of the transmission resource to which the to-be-sent data is mapped at each moment in the transmission process, and may map the to-be-sent data based on the calculated location. In this manner, frequency hopping can be better implemented, thereby increasing an anti-interference capability in the transmission process. In addition, during frequency hopping, the resource element block may be used as the minimum unit to perform frequency hopping. Compared with a solution in which the PRB is used as the minimum unit to perform frequency hopping, the frequency hopping pattern provided in the embodiments of the present invention reduces a granularity of frequency hopping, and apparently helps to further improve the anti-interference capability, thereby improving transmission reliability.

With reference to the first possible implementation of the first aspect, in a second possible implementation of the first aspect, the calculating, by the terminal device, a location of a transmission resource to which the to-be-sent data is mapped at each moment in the transmission process based on the indication of the control signaling may be implemented in the following manner: if the control signaling indicates that the frequency hopping pattern in the transmission process after the to-be-sent data is mapped to the transmission resource is intra-short transmission time interval frequency hopping, calculating, by the terminal device based on an initial location to which the to-be-sent data is mapped, a frequency hopping group quantity in a process of intra-short transmission time interval frequency hopping, a quantity of resource element blocks that are within one symbol and that can be used to carry the to-be-sent data, and an offset in the process of intra-short transmission time interval frequency hopping, the location of the transmission resource to which the to-be-sent data is mapped at each moment in the transmission process.

The embodiments of the present invention provide the frequency hopping pattern of intra-short transmission time interval frequency hopping, and also provide how to calculate the location of the transmission resource to which the to-be-sent data is mapped at each moment in the transmission process in this frequency hopping pattern, to implement intra-short transmission time interval frequency hopping.

With reference to the first possible implementation of the first aspect, in a third possible implementation of the first aspect, the calculating, by the terminal device, a location of a transmission resource to which the to-be-sent data is mapped at each moment in the transmission process based on the indication of the control signaling may be implemented in the following manner: if the control signaling indicates that the frequency hopping pattern in the transmission process after the to-be-sent data is mapped to the transmission resource is intra-short transmission time interval and inter-short transmission time interval frequency hopping, calculating, by the terminal device based on an initial location to which the to-be-sent data is mapped, a quantity of resource element blocks that are within one symbol and that can be used to carry the to-be-sent data, a frequency hopping group quantity in a process of intra-short transmission time interval and inter-short transmission time interval frequency hopping, and an offset in the process of intra-short transmission time interval and inter-short transmission time interval frequency hopping, the location of the transmission resource to which the to-be-sent data is mapped at each moment in the transmission process.

The embodiments of the present invention provide the frequency hopping pattern of intra-short transmission time interval and inter-short transmission time interval frequency hopping, and also provide how to calculate the location of the transmission resource to which the to-be-sent data is mapped at each moment in the transmission process in this frequency hopping pattern, to implement intra-short transmission time interval and inter-short transmission time interval frequency hopping. With reference to the first possible implementation of the first aspect, in a fourth possible implementation of the first aspect, the calculating, by the terminal device, a location of a transmission resource to which the to-be-sent data is mapped at each moment in the transmission process based on the indication of the control signaling may be implemented in the following manner: if the control signaling indicates that the frequency hopping pattern in the transmission process after the to-be-sent data is mapped to the transmission resource is short transmission time interval bundling frequency hopping, calculating, by the terminal device based on an initial location to which the to-be-sent data is mapped, a quantity of resource element blocks that are within one symbol and that can be used to carry the to-be-sent data, a quantity of symbols used to carry the to-be-sent data in a process of short transmission time interval bundling frequency hopping, a frequency hopping group quantity in the process of short transmission time interval bundling frequency hopping, and an offset in the process of short transmission time interval bundling frequency hopping, the location of the transmission resource to which the to-be-sent data is mapped at each moment in the transmission process.

The embodiments of the present invention provide the frequency hopping pattern of short transmission time interval bundling frequency hopping, and also provide how to calculate the location of the transmission resource to which the to-be-sent data is mapped at each moment in the transmission process in this frequency hopping pattern, to implement short transmission time interval bundling frequency hopping.

With reference to any one of the first possible implementation to the fourth possible implementation of the first aspect, in a fifth possible implementation of the first aspect, M frequency bands are allocated in advance in an uplink transmission resource of the terminal device, and in the M frequency bands, the resource element block is used as the minimum unit for mapping data whose type is a preset type, where M is a positive integer; and the mapping, by the terminal device, the to-be-sent data to the transmission resource based on the calculated location of the transmission resource and by using the resource element block as the unit may be implemented in the following manner: mapping, by the terminal device, the to-be-sent data to a transmission resource of at least one of the M frequency bands based on the calculated location of the transmission resource and by using the resource element block as the unit.

Considering that some service data other than service data that has a relatively high latency requirement and/or a relatively high transmission reliability requirement may need to be transmitted, the M frequency bands may be allocated in advance in the uplink transmission resource of the terminal device, and the service data that has a relatively high latency requirement and/or a relatively high transmission reliability requirement may be transmitted in the M frequency bands. For example, data having the preset type may be mapped in the M frequency bands by using the resource element block as the minimum unit, and some other service data may be transmitted in frequency bands other than the M frequency bands. For example, the PRB may continue to be used as the minimum unit to perform mapping. In this way, different types of service data are transmitted separately to reduce mutual interference, and minimal changes can be made to system specifications.

According to a second aspect, a second transmission resource mapping method is provided. The method may include: sending, by a network device, control signaling to a terminal device, where the control signaling is used to indicate a mapping mode to be used by the terminal device to map to-be-sent data to a transmission resource, the mapping mode includes that a minimum unit for mapping the to-be-sent data is a resource element block and a frequency hopping pattern in a transmission process after the to-be-sent data is mapped to the transmission resource, and a length of the resource element block in time domain is less than a length of a physical resource block in time domain; and receiving, by the network device based on the indication of the control signaling and by using the resource element block as a unit, the to-be-sent data mapped to the transmission resource.

The embodiments of the present invention provide a new transmission resource mapping mode. In this mapping mode, the network device may send the control signaling to the terminal device. The terminal device may perform resource mapping based on the control signaling, the minimum unit for mapping is the resource element block, and the length of the resource element block in time domain is less than the length of the physical resource block in time domain. In this way, a granularity is relatively small during mapping, latency in the transmission process can be effectively reduced, and this mapping mode is totally applicable to a service that has a relatively high latency requirement.

With reference to the second aspect, in a first possible implementation of the second aspect, the receiving, by the network device based on the indication of the control signaling and by using the resource element block as a unit, the to-be-sent data mapped to the transmission resource may be implemented in the following manner: calculating, by the network device, a location of a transmission resource to which the to-be-sent data is mapped at each moment in the transmission process based on the indication of the control signaling, and receiving, by the network device based on the calculated location of the transmission resource and by using the resource element block as the unit, the to-be-sent data mapped to the transmission resource.

If frequency hopping needs to be performed, in addition to that the terminal device may calculate the location of the transmission resource to which the to-be-sent data is mapped at each moment in the transmission process, the network device may calculate the location of the transmission resource to which the to-be-sent data is mapped at each moment in the transmission process, and the network device may receive the data sent by the terminal device based on the calculated location. In this manner, frequency hopping can be better implemented, thereby improving an anti-interference capability in the transmission process. In addition, during frequency hopping, the resource element block may be used as the minimum unit to perform frequency hopping. Compared with a solution in which the PRB is used as the minimum unit to perform frequency hopping, the frequency hopping pattern provided in the embodiments of the present invention reduces a granularity of frequency hopping, and apparently helps to further improve the anti-interference capability, thereby improving transmission reliability. Moreover, a calculation manner used when the terminal device calculates the location of the transmission resource to which the to-be-sent data is mapped at each moment in the transmission process may be the same as a calculation manner used when the network device calculates the location of the transmission resource to which the to-be-sent data is mapped at each moment in the transmission process. In this way, the data sent by the terminal device can be received relatively accurately.

With reference to the first possible implementation of the second aspect, in a second possible implementation of the second aspect, the calculating, by the network device, a location of a transmission resource to which the to-be-sent data is mapped at each moment in the transmission process based on the indication of the control signaling may be implemented in the following manner: if the control signaling indicates that the frequency hopping pattern in the transmission process after the to-be-sent data is mapped to the transmission resource is intra-short transmission time interval frequency hopping, calculating, by the network device based on an initial location to which the to-be-sent data is mapped, a quantity of resource element blocks that are within one symbol and that can be used to carry the to-be-sent data, a quantity of resource element blocks used to carry the to-be-sent data in a process of intra-short transmission time interval frequency hopping, and an offset in the process of intra-short transmission time interval frequency hopping, the location of the transmission resource to which the to-be-sent data is mapped at each moment in the transmission process.

The embodiments of the present invention provide the frequency hopping pattern of intra-short transmission time interval frequency hopping, and also provide how to calculate the location of the transmission resource to which the to-be-sent data is mapped at each moment in the transmission process in this frequency hopping pattern, to implement intra-short transmission time interval frequency hopping. The network device may perform calculation to receive relatively accurately the data transmitted by the terminal device by using the pattern of intra-short transmission time interval frequency hopping.

With reference to the first possible implementation of the second aspect, in a third possible implementation of the second aspect, the calculating, by the network device, a location of a transmission resource to which the to-be-sent data is mapped at each moment in the transmission process based on the indication of the control signaling may be implemented in the following manner: if the control signaling indicates that the frequency hopping pattern in the transmission process after the to-be-sent data is mapped to the transmission resource is intra-short transmission time interval and inter-short transmission time interval frequency hopping, calculating, by the network device based on an initial location to which the to-be-sent data is mapped, a quantity of resource element blocks that are within one symbol and that can be used to carry the to-be-sent data, in a process of intra-short transmission time interval and inter-short transmission time interval frequency hopping, a quantity of symbols used to carry the to-be-sent data, a frequency hopping group quantity in the process of intra-short transmission time interval and inter-short transmission time interval frequency hopping, and an offset in the process of intra-short transmission time interval and inter-short transmission time interval frequency hopping, the location of the transmission resource to which the to-be-sent data is mapped at each moment in the transmission process.

The embodiments of the present invention provide the frequency hopping pattern of intra-short transmission time interval and inter-short transmission time interval frequency hopping, and also provide how to calculate the location of the transmission resource to which the to-be-sent data is mapped at each moment in the transmission process in this frequency hopping pattern, to implement intra-short transmission time interval and inter-short transmission time interval frequency hopping. The network device may perform calculation to receive relatively accurately the data transmitted by the terminal device by using the pattern of intra-short transmission time interval and inter-short transmission time interval frequency hopping.

With reference to the first possible implementation of the second aspect, in a fourth possible implementation of the second aspect, the calculating, by the network device, a location of a transmission resource to which the to-be-sent data is mapped at each moment in the transmission process based on the indication of the control signaling may be implemented in the following manner: if the control signaling indicates that the frequency hopping pattern in the transmission process after the to-be-sent data is mapped to the transmission resource is short transmission time interval bundling frequency hopping, calculating, by the network device based on an initial location to which the to-be-sent data is mapped, a quantity of resource element blocks that are within one symbol and that can be used to carry the to-be-sent data, a quantity of symbols used to carry the to-be-sent data in a process of short transmission time interval bundling frequency hopping, a frequency hopping group quantity in the process of short transmission time interval bundling frequency hopping, and an offset in the process of short transmission time interval bundling frequency hopping, the location of the transmission resource to which the to-be-sent data is mapped at each moment in the transmission process.

The embodiments of the present invention provide the frequency hopping pattern of short transmission time interval bundling frequency hopping, and also provide how to calculate the location of the transmission resource to which the to-be-sent data is mapped at each moment in the transmission process in this frequency hopping pattern, to implement short transmission time interval bundling frequency hopping. The network device may perform calculation to receive relatively accurately the data transmitted by the terminal device by using the pattern of short transmission time interval bundling frequency hopping.

With reference to any one of the first possible implementation to the fourth possible implementation of the second aspect, in a fifth possible implementation of the second aspect, M frequency bands are allocated in advance in an uplink transmission resource of the terminal device, and in the M frequency bands, the resource element block is used as the minimum unit for mapping data whose type is a preset type, where M is a positive integer; and the receiving, by the network device based on the calculated location of the transmission resource and by using the resource element block as the unit, the to-be-sent data mapped to the transmission resource may be implemented in the following manner: receiving, by the network device based on the calculated location of the transmission resource and by using the resource element block as the unit, the to-be-sent data mapped to a transmission resource of at least one of the M frequency bands.

Considering that some service data other than service data that has a relatively high latency requirement and/or a relatively high transmission reliability requirement may need to be transmitted, the M frequency bands may be allocated in advance in the uplink transmission resource of the terminal device, and the service data that has a relatively high latency requirement and/or a relatively high transmission reliability requirement may be transmitted in the M frequency bands. For example, data having the preset type may be mapped in the M frequency bands by using the resource element block as the minimum unit, and some other service data may be transmitted in frequency bands other than the M frequency bands. For example, the PRB may continue to be used as the minimum unit to perform mapping. In this way, different types of service data are transmitted separately to reduce mutual interference, and minimal changes can be made to system specifications.

According to a third aspect, a first terminal device is provided. The terminal device may include a memory, a receiver, and a processor. The memory may store an instruction required by the processor to perform a task. The receiver may receive control signaling sent by a network device, where the control signaling is used to indicate a mapping mode to be used by the terminal device to map to-be-sent data to a transmission resource, the mapping mode includes that a minimum unit for mapping the to-be-sent data is a resource element block and a frequency hopping pattern in a transmission process after the to-be-sent data is mapped to the transmission resource, and a length of the resource element block in time domain is less than a length of a physical resource block in time domain. The processor may execute the instruction stored in the memory to map the to-be-sent data to the transmission resource based on the indication of the control signaling and by using the resource element block as a unit.

With reference to the third aspect, in a first possible implementation of the third aspect, the processor may be configured to: calculate a location of a transmission resource to which the to-be-sent data is mapped at each moment in the transmission process based on the indication of the control signaling, and map, by the terminal device, the to-be-sent data to the transmission resource based on the calculated location of the transmission resource and by using the resource element block as the unit.

With reference to the first possible implementation of the third aspect, in a second possible implementation of the third aspect, that the processor may be configured to calculate a location of a transmission resource to which the to-be-sent data is mapped at each moment in the transmission process based on the indication of the control signaling may include: if the control signaling indicates that the frequency hopping pattern in the transmission process after the to-be-sent data is mapped to the transmission resource is intra-short transmission time interval frequency hopping, calculating, based on an initial location to which the to-be-sent data is mapped, a frequency hopping group quantity in a process of intra-short transmission time interval frequency hopping, a quantity of resource element blocks that are within one symbol and that can be used to carry the to-be-sent data, and an offset in the process of intra-short transmission time interval frequency hopping, the location of the transmission resource to which the to-be-sent data is mapped at each moment in the transmission process.

With reference to the first possible implementation of the third aspect, in a third possible implementation of the third aspect, that the processor may be configured to calculate a location of a transmission resource to which the to-be-sent data is mapped at each moment in the transmission process based on the indication of the control signaling may include: if the control signaling indicates that the frequency hopping pattern in the transmission process after the to-be-sent data is mapped to the transmission resource is intra-short transmission time interval and inter-short transmission time interval frequency hopping, calculating, based on an initial location to which the to-be-sent data is mapped, a quantity of resource element blocks that are within one symbol and that can be used to carry the to-be-sent data, a frequency hopping group quantity in a process of intra-short transmission time interval and inter-short transmission time interval frequency hopping, and an offset in the process of intra-short transmission time interval and inter-short transmission time interval frequency hopping, the location of the transmission resource to which the to-be-sent data is mapped at each moment in the transmission process.

With reference to the first possible implementation of the third aspect, in a fourth possible implementation of the third aspect, that the processor may be configured to calculate a location of a transmission resource to which the to-be-sent data is mapped at each moment in the transmission process based on the indication of the control signaling may include: if the control signaling indicates that the frequency hopping pattern in the transmission process after the to-be-sent data is mapped to the transmission resource is short transmission time interval bundling frequency hopping, calculating, based on an initial location to which the to-be-sent data is mapped, a quantity of resource element blocks that are within one symbol and that can be used to carry the to-be-sent data, a quantity of symbols used to carry the to-be-sent data in a process of short transmission time interval bundling frequency hopping, a frequency hopping group quantity in the process of short transmission time interval bundling frequency hopping, and an offset in the process of short transmission time interval bundling frequency hopping, the location of the transmission resource to which the to-be-sent data is mapped at each moment in the transmission process.

With reference to any one of the first possible implementation to the fourth possible implementation of the third aspect, in a fifth possible implementation of the third aspect, M frequency bands are allocated in advance in an uplink transmission resource of the terminal device, and in the M frequency bands, the resource element block is used as the minimum unit for mapping data whose type is a preset type, where M is a positive integer. That the processor maps the to-be-sent data to the transmission resource based on the calculated location of the transmission resource and by using the resource element block as the unit may include: mapping the to-be-sent data to a transmission resource of at least one of the M frequency bands based on the calculated location of the transmission resource and by using the resource element block as the unit.

According to a fourth aspect, a first network device is provided. The network device may include a memory, a processor, and a transmitter. The memory may store an instruction required by the processor to perform a task. The transmitter may be configured to send control signaling to a terminal device, where the control signaling is used to indicate a mapping mode to be used by the terminal device to map to-be-sent data to a transmission resource, the mapping mode includes that a minimum unit for mapping the to-be-sent data is a resource element block and a frequency hopping pattern in a transmission process after the to-be-sent data is mapped to the transmission resource, and a length of the resource element block in time domain is less than a length of a physical resource block in time domain. The processor may be configured to execute the instruction stored in the memory to receive, based on the indication of the control signaling and by using the resource element block as a unit, the to-be-sent data mapped to the transmission resource.

With reference to the fourth aspect, in a first possible implementation of the fourth aspect, the processor may be configured to: calculate a location of a transmission resource to which the to-be-sent data is mapped at each moment in the transmission process based on the indication of the control signaling, and receive, by the network device based on the calculated location of the transmission resource and by using the resource element block as the unit, the to-be-sent data mapped to the transmission resource.

With reference to the first possible implementation of the fourth aspect, in a second possible implementation of the fourth aspect, that the processor is configured to calculate a location of a transmission resource to which the to-be-sent data is mapped at each moment in the transmission process based on the indication of the control signaling may include: if the control signaling indicates that the frequency hopping pattern in the transmission process after the to-be-sent data is mapped to the transmission resource is intra-short transmission time interval frequency hopping, calculating, based on an initial location to which the to-be-sent data is mapped, a quantity of resource element blocks that are within one symbol and that can be used to carry the to-be-sent data, a quantity of resource element blocks used to carry the to-be-sent data in a process of intra-short transmission time interval frequency hopping, and an offset in the process of intra-short transmission time interval frequency hopping, the location of the transmission resource to which the to-be-sent data is mapped at each moment in the transmission process.

With reference to the first possible implementation of the fourth aspect, in a third possible implementation of the fourth aspect, that the processor is configured to calculate a location of a transmission resource to which the to-be-sent data is mapped at each moment in the transmission process based on the indication of the control signaling may include: if the control signaling indicates that the frequency hopping pattern in the transmission process after the to-be-sent data is mapped to the transmission resource is intra-short transmission time interval and inter-short transmission time interval frequency hopping, calculating, based on an initial location to which the to-be-sent data is mapped, a quantity of resource element blocks that are within one symbol and that can be used to carry the to-be-sent data, in a process of intra-short transmission time interval and inter-short transmission time interval frequency hopping a quantity of symbols used to carry the to-be-sent data, a frequency hopping group quantity in the process of intra-short transmission time interval and inter-short transmission time interval frequency hopping, and an offset in the process of intra-short transmission time interval and inter-short transmission time interval frequency hopping, the location of the transmission resource to which the to-be-sent data is mapped at each moment in the transmission process.

With reference to the first possible implementation of the fourth aspect, in a fourth possible implementation of the fourth aspect, that the processor is configured to calculate a location of a transmission resource to which the to-be-sent data is mapped at each moment in the transmission process based on the indication of the control signaling may include: if the control signaling indicates that the frequency hopping pattern in the transmission process after the to-be-sent data is mapped to the transmission resource is short transmission time interval bundling frequency hopping, calculating, based on an initial location to which the to-be-sent data is mapped, a quantity of resource element blocks that are within one symbol and that can be used to carry the to-be-sent data, a quantity of symbols used to carry the to-be-sent data in a process of short transmission time interval bundling frequency hopping, a frequency hopping group quantity in the process of short transmission time interval bundling frequency hopping, and an offset in the process of short transmission time interval bundling frequency hopping, the location of the transmission resource to which the to-be-sent data is mapped at each moment in the transmission process.

With reference to any one of the first possible implementation to the fourth possible implementation of the fourth aspect, in a fifth possible implementation of the fourth aspect, M frequency bands are allocated in advance in an uplink transmission resource of the terminal device, and in the M frequency bands, the resource element block is used as the minimum unit for mapping data whose type is a preset type, where M is a positive integer. That the processor receives, based on the calculated location of the transmission resource and by using the resource element block as the unit, the to-be-sent data mapped to the transmission resource may include: receiving, by the network device, based on the calculated location of the transmission resource and by using the resource element block as the unit, the to-be-sent data mapped to a transmission resource of at least one of the M frequency bands.

According to a fifth aspect, a second terminal device is provided. The terminal device may include modules configured to perform the method in the first aspect.

According to a sixth aspect, a second network device is provided. The network device may include modules configured to perform the method in the first aspect.

According to a seventh aspect, a computer storage medium is provided, where the computer storage medium may store a program, and when the program is executed, some or all steps in any transmission resource mapping method recorded in the first aspect are performed.

According to an eighth aspect, another computer storage medium is provided, where the computer storage medium may store a program, and when the program is executed, some or all steps in any transmission resource mapping method recorded in the second aspect are performed.

Optionally, the computer storage medium in the seventh aspect and the computer storage medium in the eighth aspect may be the same storage medium or may be different storage media.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and persons of ordinary skill in the art may derive other drawings from these accompanying drawings without creative efforts.

FIG. 1 is a schematic diagram of a possible application scenario according to an embodiment of the present invention;

FIG. 2 is a possible flowchart of a first transmission resource mapping method according to an embodiment of the present invention;

FIG. 5 is a schematic diagram of a pattern of intra-short transmission time interval frequency hopping according to an embodiment of the present invention;

FIG. 6 is a schematic diagram of a pattern of intra-short transmission time interval and inter-short transmission time interval frequency hopping according to an embodiment of the present invention;

FIG. 7 is a schematic diagram of a pattern of short transmission time interval bundling frequency hopping according to an embodiment of the present invention;

DESCRIPTION OF EMBODIMENTS

Figure 3:
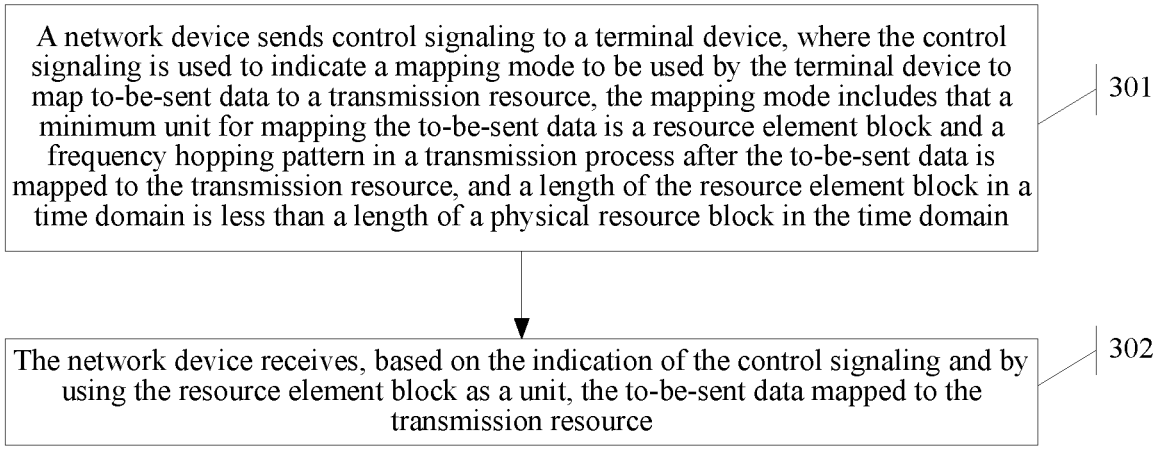
FIG. 3 is a possible flowchart of a second transmission resource mapping method according to an embodiment of the present invention.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Technologies described in this specification may be applied to various communications systems such as a 3G communications system, a 4G communications system or a next-generation communications system, for example, a Global System for Mobile communications (Global System for Mobile communications, GSM), a code division multiple access (Code Division Multiple Access, CDMA) system, a time division multiple access (Time Division Multiple Access, TDMA) system, wideband code division multiple access (Wideband Code Division Multiple Access Wireless, WCDMA), a frequency division multiple access (Frequency Division Multiple Addressing, FDMA) system, an orthogonal frequency division multiple access (Orthogonal Frequency-Division Multiple Access, OFDMA) system, an SC-FDMA system, a general packet radio service (General Packet Radio Service, GPRS) system, a Long Term Evolution (Long Term Evolution, LTE) system, a future 5G system, and another possible communications system.

For ease of understanding by persons skilled in the art, some terms used in the embodiments of the present invention are explained in the following:

1) A terminal device is a device that provides a user with voice and/or data connectivity, and for example, may include a handheld device having a wireless connection function or a processing device connected to a wireless modem. The terminal device may communicate with a core network by using a radio access network (Radio Access Network, RAN), and exchange voice and/or data with the RAN. The terminal device may include UE, a wireless terminal device, a mobile terminal device, a subscriber unit (Subscriber Unit), a subscriber station (Subscriber Station), a mobile station (Mobile Station), a mobile (Mobile), a remote station (Remote Station), an access point (Access Point, AP), a remote terminal device (Remote Terminal), an access terminal device (Access Terminal), a user terminal device (User Terminal), a user agent (User Agent), a user device (User Device), or the like. For example, the terminal device may include a mobile phone (or referred to as a "cellular" phone), a computer having a mobile terminal device, and a portable, pocket-sized, handheld, computer built-in or in-vehicle mobile apparatus. For example, the terminal device may be a device such as a personal communications service (Personal Communication Service, PCS) phone, a cordless telephone set, a Session Initiation Protocol (SIP) phone, a wireless local loop (Wireless Local Loop, WLL) station, or a personal digital assistant (Personal Digital Assistant, PDA).

2) A network device that includes, for example, a base station (for example, an access point), may be a device that communicates with a wireless terminal device over an air interface by using one or more sectors in an access network. The base station may be configured to perform conversion between a received over-the-air frame and an Internet Protocol (IP) packet, and is used as a router between the wireless terminal device and the rest of the access network. The rest of the access network may include an IP network. The base station may further coordinate attribute management of the air interface. For example, the base station may include a radio network controller (Radio Network Controller, RNC) or a base station controller (Base Station Controller, BSC), or may include an evolved base station (a NodeB or an eNB or e-NodeB, evolutional Node B) in an LTE-Advanced (LTE-Advanced, LTE-A) system, and is not limited in the embodiments of the present invention.

3) A frequency hopping (Frequency-Hopping Spread Spectrum, FHSS) technology is a method of performing frequency shift keying by using a pseudorandom code sequence to enable a carrier frequency to continuously hop to spread a spectrum. The frequency hopping technology is a relatively mature technology at present in the whole world and can effectively avoid interference and utilization efficacy of a communications system. A carrier frequency of frequency hopping is generally controlled by a pseudorandom code. In a working bandwidth range of the carrier frequency, a frequency synthesizer of a transmitter continuously changes a frequency according to a random pattern of a pseudorandom code. At a receive end, a frequency synthesizer of a receiver is controlled by the pseudorandom code and is kept consistent with a changing pattern at a transmit end.

4) A PRB is a minimum unit for resource mapping in a 4G system. One PRB generally includes seven OFDMA symbols or seven SC-FDMA symbols in time domain and generally includes twelve subcarriers in frequency domain.

5) A short transmission time interval (short Transmission Time Interval, sTTI) is a minimum unit for URLLC service data processing. A length of an sTTI in time domain is a length of at least one OFDMA symbol or one SC-FDMA symbol in time domain.

6) A resource element block may be, for example, referred to as an REB for short. The English full name of the resource element block is, for example, "Resource element Block". A resource element block is a feature proposed in the embodiments of the present invention. A name of the feature does not constitute a limitation to the feature. The feature may totally have other names in Chinese or English in standards or other applications. The feature is temporarily referred to as the REB in the embodiments of the present invention.

Optionally, for example, the REB may include one or more OFDMA symbols or SC-FDMA symbols in time domain. A quantity of symbols included in one REB in time domain may be less than a quantity of symbols included in one PRB in time domain. That is, a length of one REB in time domain may be less than a length of one PRB in time domain. In this manner, a granularity of resource mapping can be reduced, thereby reducing latency.

Optionally, the REB may include a plurality of subcarriers in frequency domain, and for example, may include six subcarriers, or may include twelve subcarriers, or may further include more or fewer subcarriers. This is not limited in the embodiments of the present invention.

Optionally, a possible REB may include a service data resource element (Resource element, RE) and a demodulation reference signal (Demodulation reference signal, DMRS) RE. For example, the service data RE can be used to carry service data. The DMRS RE can be used to carry a DMRS corresponding to the service data. The DMRS may be used to perform channel estimation and detection on a channel for transmitting the service data. Certainly, it is only an example that the REB includes a service data RE and a DMRS RE. Content included in the REB is not limited thereto.

In addition, the service data may be directly referred to as data in the embodiments of the present invention.

7) Terms "system" and "network" may be used interchangeably in the embodiments of the present invention. "A plurality of" means "two or more". In view of this, in the embodiments of the present invention, "a plurality of" may be understood as "at least two". The term "and/or" describes an association relationship for describing associated objects and represents that three relationships may exist. For example, A and/or B may denote the following three cases: Only A exists, both A and B exist, and only B exists. In addition, the character "/" generally indicates an "or" relationship between the associated objects if there is no special description.

Referring to FIG. 1, FIG. 1 is a schematic diagram of a possible application scenario according to an embodiment of the present invention. In FIG. 1, for example, a network device is a base station, and a terminal device is a mobile phone. For example, if the mobile phone needs to send data to the base station, the mobile phone needs to map the data to a transmission resource and then sends the data to the base station by using the transmission resource.

The technical solutions provided in the embodiments of the present invention are described below with reference to the accompanying drawings.

Referring to FIG. 2, a first transmission resource mapping method is provided. A procedure of the method is described as follows:

Step 201: A terminal device receives control signaling sent by a network device, where the control signaling is used to indicate a mapping mode to be used by the terminal device to map to-be-sent data to a transmission resource, the mapping mode includes that a minimum unit for mapping the to-be-sent data is a resource element block and a frequency hopping pattern in a transmission process after the to-be-sent data is mapped to the transmission resource, and a length of the resource element block in time domain is less than a length of a physical resource block in time domain.

Step 202: The terminal device maps the to-be-sent data to the transmission resource based on the indication of the control signaling and by using the resource element block as a unit.

Referring to FIG. 3, a second transmission resource mapping method is provided. A procedure of the method is described as follows:

Step 301: A network device sends control signaling to a terminal device, where the control signaling is used to indicate a mapping mode to be used by the terminal device to map to-be-sent data to a transmission resource, the mapping mode includes that a minimum unit for mapping the to-be-sent data is a resource element block and a frequency hopping pattern in a transmission process after the to-be-sent data is mapped to the transmission resource, and a length of the resource element block in time domain is less than a length of a physical resource block in time domain.

Step 302: The network device receives, based on the indication of the control signaling and by using the resource element block as a unit, the to-be-sent data mapped to the transmission resource. The methods in FIG. 2 and FIG. 3 correspond to each other, and are described together below.

The terminal device may send uplink data to the network device under scheduling by the network device. The network device may first send the control signaling to the terminal device. For example, the control signaling may indicate the mapping mode to be used by the terminal device to map the to-be-sent data to the transmission resource. Optionally, the mapping mode may include: the minimum unit for performing resource mapping for the to-be-sent data and the frequency hopping pattern in the transmission process after the to-be-sent data is mapped to the transmission resource. In this embodiment of the present invention, for example, the minimum unit for performing resource mapping for the to-be-sent data is the REB. In this way, after receiving the control signaling sent by the network device, the terminal device can perform resource mapping based on the indication of the control signaling.

Optionally, the technical solution provided in this embodiment of the present invention may be applied to a service having a relatively high latency requirement, and may further be applied to a service having both a relatively high latency requirement and a relatively high transmission reliability requirement, or may be applied to a service having a relatively high transmission reliability requirement. The REB is used as the minimum unit to perform resource mapping, so that a granularity in a process of frequency hopping is smaller than that when the PRB is used to perform mapping, so that an anti-interference capability in the transmission process can be improved, and transmission reliability is improved.

Optionally, there are some ordinary services apart from some services having a relatively high latency reliability requirement and/or a relatively high reliability requirement. For example, the PRB may continue to be used as the minimum unit to perform mapping for some ordinary services. For distinguishing, M frequency bands may be allocated in advance in an uplink transmission resource of the terminal device in this embodiment of the present invention. For example, it is specified that the REB is used as the minimum unit to perform resource mapping for data whose type is a preset type in the M frequency bands. For example, the preset type may be a type corresponding to a service that has a relatively high latency requirement. Alternatively, for example, the preset type may be a type corresponding to a service that has both a relatively high latency requirement and a relatively high transmission reliability requirement. In this way, when resource mapping is performed for data having the preset type, the data may be mapped to at least one of the M frequency bands. For example, a URLLC service is a service having both a relatively high latency requirement and a relatively high transmission reliability requirement. The transmission reliability herein mainly includes an anti-interference capability in the transmission process. For example, anti-interference in a particular degree can be implemented by frequency hopping. In an existing technology, resource mapping is performed by using the PRB as the minimum unit. Therefore, frequency hopping is performed by using the PRB as a granularity. Apparently, the granularity of frequency hopping is relatively large. As a result, latency is relatively long, and anti-interference is not facilitated. In the manner provided in this embodiment of the present invention, the terminal device may use the REB as the minimum unit to perform resource mapping for data having the preset type, and naturally, the REB is used as a granularity to perform frequency hopping. The network device may use the REB as the minimum unit to receive data mapped to the transmission resource. The length of the REB in time domain is less than the length of the PRB in time domain. In this manner, not only latency can be reduced, but also an anti-interference capability in a process of frequency hopping can be improved.

Optionally, the M frequency bands may be continuous frequency bands, or may be discrete frequency bands.

Optionally, the M frequency bands may include a frequency band used to transmit data having a preset type, and may further include a frequency band used to transmit control information having a preset type. Alternatively, the M frequency bands may either not include a frequency band used to transmit control information having a preset type. That is, if the M frequency bands include a frequency band used to transmit control information having a preset type, the terminal device may also use the REB as the minimum unit to perform resource mapping for the control information having the preset type. If the M frequency bands do not include a frequency band used to transmit control information having a preset type, the terminal device may use the PRB as the minimum unit to perform resource mapping for the control information having the preset type. Whether to use the REB or the PRB as the minimum unit to perform mapping for the control information having the preset type may be indicated by the network device or may be specified in advance by using a protocol or standard or may be negotiated in advance by the terminal device and the network device.

Optionally, for the M frequency bands, during transmission of data having a non-preset type, for example, during transmission of data having another type, the REB may continue to be used as the minimum unit to perform mapping, or the PRB may be used as the minimum unit to perform mapping. Whether the REB or the PRB is used as the minimum unit to perform mapping for data having a non-preset type in the M frequency bands may be indicated by the network device or may be specified by using a protocol or a standard in advance or may be negotiated in advance by the terminal device and the network device.

Figure 4:
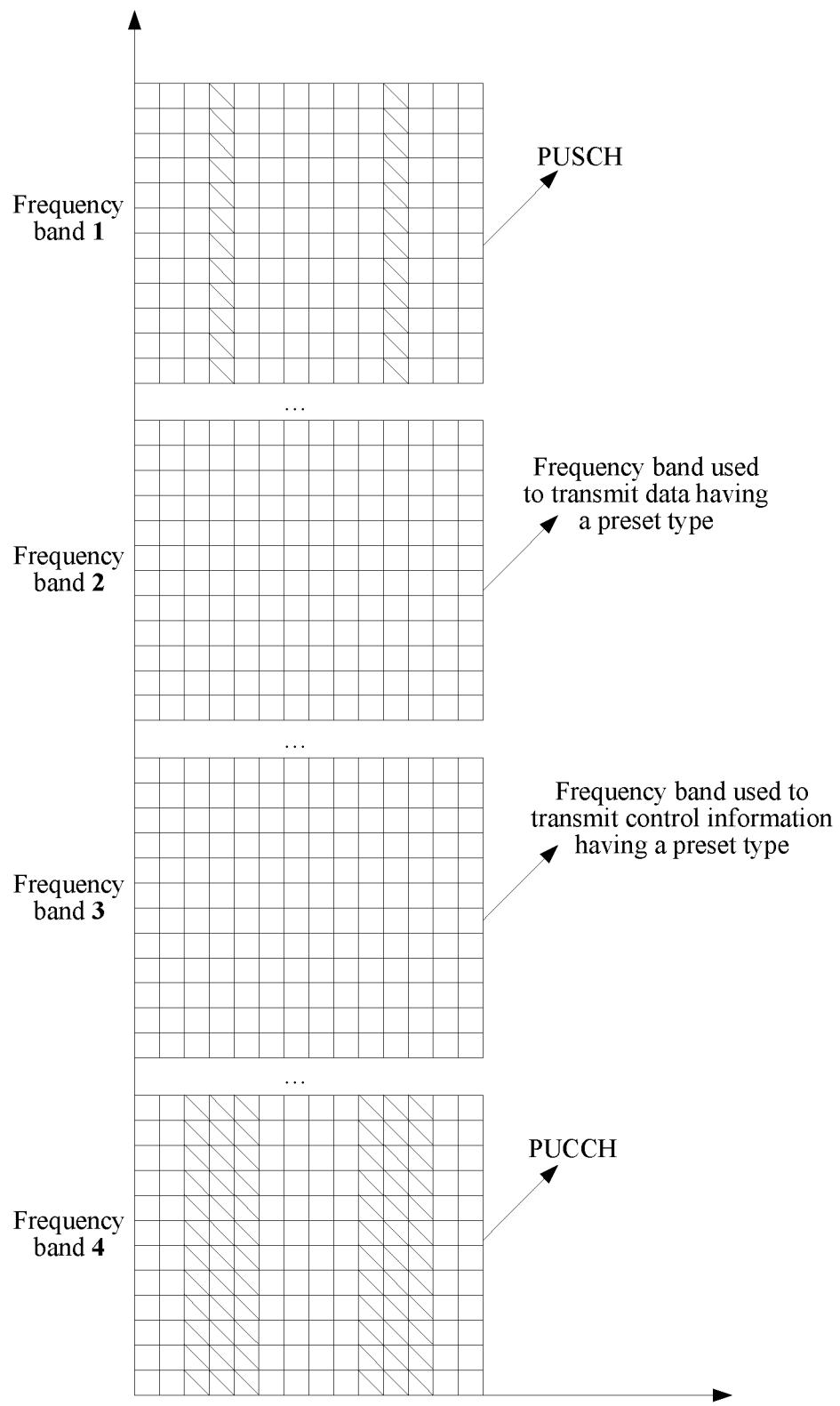
FIG. 4 is a schematic diagram of a manner of frequency band allocation according to an embodiment of the present invention.

For example, referring to FIG. 4, FIG. 4 is a possible schematic diagram of an uplink transmission resource of the terminal device after M frequency bands are allocated. A horizontal axis in FIG. 4 represents the time domain, and a vertical axis represents a frequency domain. In FIG. 4, four frequency bands, that is, a frequency band 1, a frequency band 2, a frequency band 3, and a frequency band 4 are used as an example, and are represented by four large boxes. Certainly, during actual application, the uplink transmission resource of the terminal device may be not limited thereto. In FIG. 4, for example, the frequency band 2 and the frequency band 3 are the M allocated frequency bands. That is, in this case, M=2. In the frequency band 1 and the frequency band 4, the PRB is still used as the minimum unit to perform resource mapping. For example, the frequency band 2 is a frequency band used to transmit data having a preset type, and the frequency band 3 is a frequency band used to transmit control information having a preset type. That is, in FIG. 4, in the frequency band used to transmit control information, for example, the PRB continues to be used as the minimum unit to perform resource mapping. In FIG. 4, areas with sloping lines represent areas for carrying a DMRS, and areas other than the areas used to carry a DMRS may denote areas used to carry data. In FIG. 4, for example, the frequency band 1 is an area for transmitting a PUSCH, and the frequency band 4 is an area for transmitting a physical uplink control channel (Physical Uplink Control Channel, PUCCH). In FIG. 4, in the frequency band 1 to the frequency band 4, each column in the areas other than the areas used to carry a DMRS represents one symbol, which may be, for example, an OFDMA symbol or an SC-FDMA symbol.

Optionally, the network device may allocate REBs to data having the preset type. For example, the network device may number each REB included in the M frequency bands. That is, a unique sequence number is set for each REB. The network device may allocate the REBs to the terminal device and may notify sequence numbers of the allocated REBs to the terminal device, so that the terminal device may perform resource mapping based on the REBs allocated by the network device. Optionally, the sequence numbers of the REBs allocated by the network device for any piece of data transmitted by the terminal device may be continuous or may be discrete.

Optionally, to achieve better anti-interference performance in the transmission process, the terminal device may send data by using a frequency hopping pattern. The terminal device and the network device may support different frequency hopping patterns, for example, may support three frequency hopping patterns, that is, intra-sTTI frequency hopping, intra-sTTI and inter-sTTI frequency hopping, and sTTI bundling frequency hopping.

For example, which frequency hopping pattern the terminal device is to use for one piece of data may be indicated by the network device, for example, may be indicated by the network device by using the control signaling, or may be specified by using a protocol or a standard, or may be negotiated in advance by the terminal device and the network device. If a frequency hopping pattern is used to send data, the terminal device needs to calculate a location of a transmission resource to which the to-be-sent data is mapped at each moment in the transmission process, to perform resource mapping based on the calculated location and by using an REB as a unit. How to calculate the location of the transmission resource to which the to-be-sent data is mapped at each moment in the transmission process by using these frequency hopping patterns is described below.

1. Intra-sTTI Frequency Hopping: Frequency Hopping is Performed within One sTTI.

If the control signaling indicates that the frequency hopping pattern in the transmission process after the to-be-sent data is mapped to the transmission resource is intra-sTTI frequency hopping, the terminal device may calculate, based on an initial location to which the to-be-sent data is mapped, a frequency hopping group quantity in a process of intra-sTTI frequency hopping, a quantity of REBs that are within one symbol and that can be used to carry the to-be-sent data, and an offset in the process of intra-sTTI frequency hopping, the location of the transmission resource to which the to-be-sent data is mapped at each moment in the transmission process.

Optionally, the initial location to which the to-be-sent data is mapped may be understood as a sequence number of an REB to which the to-be-sent data is originally mapped or may be understood as a sequence number of an REB used to carry the to-be-sent data before frequency hopping is performed for the first time for the to-be-sent data. The parameter may be indicated by the network device. For example, the network device may send the parameter to the terminal device by using high layer signaling. For example, possible high layer signaling may include Radio Resource Control (Radio Resource Control, RRC) signaling.

Optionally, the frequency hopping group quantity in the process of intra-sTTI frequency hopping sTTI may be related to a bandwidth, and may be understood as a quantity of groups involved in the process of intra-sTTI frequency hopping. For example, after the M frequency bands are allocated, all REBs included in the M frequency bands may be grouped into a plurality of groups. In this case, at least one group of REBs may be included within one sTTI. Each group may include one or more REBs. In the process of performing intra-sTTI frequency hopping, if one intra-sTTI includes two or more groups of REBs, frequency hopping may be preferentially performed between different groups within one sTTI. In this way, frequency hopping has a relatively long span, and a relatively large time domain gain and/or frequency domain gain can be obtained. In this way, at least one group is involved in the process of performing intra-sTTI frequency hopping. The at least one group means the frequency hopping group quantity in the process of intra-sTTI frequency hopping.

For example, the calculating, by the terminal device based on an initial location to which the to-be-sent data is mapped, a frequency hopping group quantity in a process of intra-sTTI frequency hopping, the quantity of REBs that are within one symbol and that can be used to carry the to-be-sent data, and an offset in the process of intra-sTTI frequency hopping, the location of the transmission resource to which the to-be-sent data is mapped at each moment in the transmission process may be implemented by using the following Formula (1) and Formula (2):

$$n_{REB}(i) = (\tilde{n}_{REB} + f_{hop}(i)) \mod (N_{REB}^{Symb}) \quad (1)$$

$$f_{hop}(i) = \begin{cases} 0, & i = 0 \\ f_{hop}(i-1) + \lfloor N_{REB}^{Symb} / n_{HO}^{REB} \rfloor, & 0 < i < n_{HO}^{REB} \\ f_{hop}(i - n_{HO}^{REB}) + \Delta n_f, & i \geq n_{HO}^{REB} \end{cases} \quad (2)$$

where mod denotes a modulo function, $n_{REB}(i)$ may denote a sequence number of an REB after frequency hopping is performed for the to-be-sent data in an $i^{th}$ symbol to which the to-be-sent data is mapped, $\tilde{n}_{REB}$ may denote a sequence number of a resource element block at the initial location to which the to-be-sent data is mapped, $N_{REB}^{Symb}$ may denote a total quantity of available REBs within one symbol, that is, the quantity of REBs that are within one symbol and that can be used to carry the to-be-sent data, $n_{HO}^{REB}$ may denote the frequency hopping group quantity in the process of intra-sTTI frequency hopping, where $n_{HO}^{REB}$ may be related to a bandwidth, $n_{HO}^{REB}$ may also be referred to as a quantity of frequency hopping resources related to a bandwidth, for example, when the preset type is a URLLC type, $n_{HO}^{REB} = \lceil N_{RB}^{URLLC} / N_{IR} \rceil * N_{IR}^{Group}$, $\lceil \: \rceil$ denotes a rounding up operation, $N_{RB}^{URLLC}$ denotes a quantity of resource blocks (Resource Block, RB) occupied by a URLLC service, $N_{IR}$ denotes a quantity of RBs irrelevant to a frequency domain, for example, a typical value of $N_{IR}$ may be 50, $N_{IR}^{Group}$ denotes a quantity of groups included in the quantity of RBs irrelevant to the frequency domain, for example, a typical value of $N_{IR}^{Group}$ may be 2, $\Delta n_f$ may denote the offset in the process of intra-sTTI frequency hopping, and $f_{hop}(i)$ may denote an overall offset caused by the process of frequency hopping. In this case, $f_{hop}(i)$ may denote an overall offset caused by the process of intra-sTTI frequency hopping.

In practice, because the initial location is known and no longer needs to be calculated, Formula (1) and Formula (2) are used to calculate locations other than the initial location to which the to-be-sent data is mapped.

One REB may be finite in the frequency domain, for example, may include six subcarriers or includes twelve subcarriers, or includes another quantity of subcarriers. The M frequency bands may have a relatively wide frequency domain coverage, which may be, for example, greater than a total bandwidth of subcarriers included in one REB. As a result, one symbol may correspond to a plurality of REBs. Therefore, $N_{REB}^{Symb}$ may be used to denote a total quantity of REBs that are within one symbol and that can be used to carry the to-be-sent data. Certainly, the M frequency bands herein may be used as a boundary. That is, frequency bands other than the M frequency bands may be excluded during calculation of $N_{REB}^{Symb}$.

Optionally, for example, $\tilde{n}_{REB}$, $N_{REB}^{Symb}$, $n_{HO}^{REB}$, and $\Delta n_f$ may all be indicated by the network device, and for example, may be notified by the network device to the terminal device by using high layer signaling. Optionally, the network device may respectively send different parameters to the terminal device by using different high layer signaling, or may send the parameters to the terminal device by using one piece of high layer signaling. If the network device sends the parameters to the terminal device by using one piece of high layer signaling, the high layer signaling and the control signaling may be, for example, one same piece of signaling. That is, by using the control signaling, the network device may indicate the mapping mode of the to-be-sent data of the terminal device and at the same time may further send required parameters to the terminal device. Alternatively, the high layer signaling and the control signaling may be different signaling.

Certainly, both the terminal device and the network device need to calculate the location of the transmission resource to which the to-be-sent data is mapped at each moment in the transmission process, so that the to-be-sent data mapped to the transmission resource can be received relatively accurately.

Optionally, the network device may calculate, based on an initial location to which the to-be-sent data is mapped, a frequency hopping group quantity in a process of intra-sTTI frequency hopping, a quantity of REBs that are within one symbol and that can be used to carry the to-be-sent data, and an offset in the process of intra-sTTI frequency hopping, the location of the transmission resource to which the to-be-sent data is mapped at each moment in the transmission process.

In a possible implementation, the network device may similarly perform calculation based on Formula (1) and Formula (2). In general, a calculation manner used by the network device needs to be consistent with a calculation manner used by the terminal device in order for the network device to receive the data sent by the terminal device.

The foregoing Formula (1) and Formula (2) are merely possible examples. During actual application, the terminal device or the network device may use another possible manner to calculate, based on an initial location to which the to-be-sent data is mapped, a frequency hopping group quantity in a process of intra-sTTI frequency hopping, a quantity of REBs that are within one symbol and that can be used to carry the to-be-sent data, and an offset in the process of intra-sTTI frequency hopping, the location of the transmission resource to which the to-be-sent data is mapped at each moment in the transmission process.

The process of intra-sTTI frequency hopping is described below by using an example.

Figure 5:
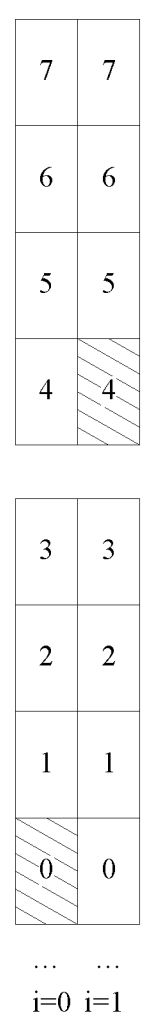

It is assumed that the network device notifies the terminal device by using high layer signaling that a pattern of intra-sTTI frequency hopping is to be used to perform resource mapping for data having the preset type, for example, data of a URLLC service, and notifies the terminal device that the initial location of performing resource mapping for the to-be-sent data is $\tilde{n}_{REB}=0$, the total quantity of REBs that are within one symbol and that can be used to carry the to-be-sent data is $N_{REB}^{Symb}=8$, the frequency hopping group quantity in the process of intra-sTTI frequency hopping is $n_{HO}^{REB}=2$, the quantity of symbols included in one intra-sTTI is $n_{Symb}^{sTTI}=2$, and the offset in the process of intra-sTTI frequency hopping $\Delta n_f=1$. In this case, referring to FIG. 5, FIG. 5 is a schematic diagram of the pattern of intra-sTTI frequency hopping during resource mapping for uplink data. In FIG. 5, each column represents one symbol. Two columns are used as an example, where i denotes a sequence number of an individual symbol. For example, i=0 represents a zero$^{th}$ symbol, and i=1 represents a first symbol. For example, the two symbols constitute one sTTI. That is, in this embodiment, one sTTI includes two symbols. Numbers in a symbol represent different locations of one symbol. A location with sloping lines is a location to which the to-be-sent data is mapped. For example, the initial location to which the to-be-sent data is mapped is a location 0 of a zero$^{th}$ symbol. After intra-sTTI frequency hopping is performed once, a location to which the to-be-sent data is mapped changes to a location 4 of the first symbol, and the like. By analogy, each location of mapping may be obtained based on Formula (1) and Formula (2).

The pattern of intra-sTTI frequency hopping is relatively simple and is relatively easy to implement.

2. Intra-sTTI and Inter-sTTI Frequency Hopping.

If the control signaling indicates that the frequency hopping pattern in the transmission process after the to-be-sent data is mapped to the transmission resource is intra-sTTI and inter-sTTI frequency hopping, the terminal device may calculate, based on an initial location to which the to-be-sent data is mapped, a quantity of symbols used to carry the to-be-sent data in a process of intra-sTTI and inter-sTTI frequency hopping, a frequency hopping group quantity in the process of intra-sTTI and inter-sTTI frequency hopping, a quantity of REBs that are within one symbol and that can be used to carry the to-be-sent data, and an offset in the process of intra-sTTI and inter-sTTI frequency hopping, the location of the transmission resource to which the to-be-sent data is mapped at each moment in the transmission process.

Optionally, the initial location to which the to-be-sent data is mapped may be indicated by the network device. For example, the network device may send the initial location to the terminal device by using high layer signaling. For example, possible high layer signaling may include Radio Resource Control (Radio Resource Control, RRC) signaling.

Optionally, the frequency hopping group quantity in the process of intra-sTTI and inter-sTTI frequency hopping may be related to a bandwidth, and may be understood as a quantity of groups involved in the process of intra-sTTI and inter-sTTI frequency hopping. For example, after the M frequency bands are allocated, all REBs included in the M frequency bands may be grouped into a plurality of groups. In this case, at least one group of REBs may be included within one sTTI. Each group may include one or more REBs. In the process of performing intra-sTTI and inter-sTTI frequency hopping, frequency hopping may be preferentially performed between different groups within one sTTI and/or between different groups within different sTTIs. In this way, a relatively large time domain gain and/or frequency domain gain can be obtained. In this way, at least one group is involved in the process of performing intra-sTTI and inter-sTTI frequency hopping. The at least one group means the frequency hopping group quantity in the process of intra-sTTI and inter-sTTI frequency hopping.

For example, the calculating, by the terminal device based on an initial location to which the to-be-sent data is mapped, a quantity of symbols used to carry the to-be-sent data in a process of intra-sTTI and inter-sTTI frequency hopping, a frequency hopping group quantity in the process of intra-sTTI and inter-sTTI frequency hopping, a quantity of REBs that are within one symbol and that can be used to carry the to-be-sent data, and an offset in the process of intra-sTTI and inter-sTTI frequency hopping, the location of the transmission resource to which the to-be-sent data is mapped at each moment in the transmission process may be implemented by using the following Formula (1) and Formula (3):

$$n_{REB}(i) = (\tilde{n}_{REB} + f_{hop}(i)) \bmod (N_{REB}^{Symb}) \quad (1)$$

$$f_{hop}(i) = \begin{cases} 0, & i = 0 \\ f_{hop}(i-1) + \lfloor N_{REB}^{Symb} / n_{HO}^{REB} \rfloor, & 0 < i < n_{HO}^{REB} n_{HO}^{Symb} \\ f_{hop}(i - n_{HO}^{REB} n_{HO}^{Symb}) + \Delta n_f, & i \geq n_{HO}^{REB} n_{HO}^{Symb} \end{cases} \quad (3)$$

where mod denotes a modulo function, $n_{REB}(i)$ may denote a sequence number of an REB after frequency hopping is performed for the to-be-sent data in an $i^{th}$ symbol to which the to-be-sent data is mapped, $\tilde{n}_{REB}$ may denote a sequence number of a resource element block at the initial location to which the to-be-sent data is mapped, $N_{REB}^{Symb}$ may denote a total quantity of available REBs within one symbol, $n_{HO}^{REB}$ may denote the frequency hopping group quantity in the process of intra-sTTI and inter-sTTI frequency hopping, where $n_{HO}^{REB}$ may be related to a bandwidth, $n_{HO}^{REB}$ may also be referred to as a quantity of frequency hopping resources related to a bandwidth, for example, when the preset type is a URLLC type, $n_{HO}^{REB} = \lceil N_{RB}^{URLLC} / N_{IR} \rceil * N_{IF}^{Group}$, $\lceil \ \rceil$ denotes a rounding up operation, $N_{RB}^{URLLC}$ denotes a quantity of resource blocks (Resource Block, RB) occupied by a URLLC service, $N_{IR}$ denotes a quantity of RBs irrelevant to a frequency domain, for example, a typical value of $N_{IR}$ may be 50, $N_{IR}^{Group}$ denotes a quantity of groups included in the quantity of RBs irrelevant to the frequency domain, for example, a typical value of $N_{IR}^{Group}$ may be 2, $n_{HO}^{Symb}$ may denote a quantity of symbols used to carry the to-be-sent data in the process of intra-sTTI and inter-sTTI frequency hopping, $n_{HO}^{Symb}$ is an integer multiple of $n_{Symb}^{sTTI}$, $\Delta n_f$ may denote the offset in the process of intra-sTTI frequency hopping, and $f_{hop}(i)$ may denote an overall offset caused by the process of frequency hopping. In this case, $f_{hop}(i)$ may denote an overall offset caused by the process of intra-sTTI frequency hopping.

In practice, because the initial location is known and no longer needs to be calculated, Formula (1) and Formula (3) are used to calculate locations other than the initial location to which the to-be-sent data is mapped.

Optionally, for example, $\tilde{n}_{REB}$, $N_{REB}^{Symb}$, $n_{HO}^{REB}$, and $\Delta n_f$ may all be indicated by the network device, and for example, may be notified by the network device to the terminal device by using high layer signaling. Optionally, the network device may respectively send different parameters to the terminal device by using different high layer signaling, or may send the parameters to the terminal device by using one piece of high layer signaling. If the network device sends the parameters to the terminal device by using one piece of high layer signaling, the high layer signaling and the control signaling may be, for example, one same piece of signaling. That is, by using the control signaling, the network device may indicate the mapping mode of the to-be-sent data of the terminal device and at the same time may further send required parameters to the terminal device. Alternatively, the high layer signaling and the control signaling may be different signaling.

Certainly, both the terminal device and the network device need to calculate the location of the transmission resource to which the to-be-sent data is mapped at each moment in the transmission process, so that the to-be-sent data mapped to the transmission resource can be received relatively accurately.

Optionally, the network device may calculate, based on an initial location to which the to-be-sent data is mapped, a quantity of symbols used to carry the to-be-sent data in a process of intra-sTTI and inter-sTTI frequency hopping, a frequency hopping group quantity in the process of intra-sTTI and inter-sTTI frequency hopping, a quantity of REBs that are within one symbol and that can be used to carry the to-be-sent data, and an offset in the process of intra-sTTI and inter-sTTI frequency hopping, the location of the transmission resource to which the to-be-sent data is mapped at each moment in the transmission process.

In a possible implementation, the network device may similarly perform calculation based on Formula (1) and Formula (3). In general, a calculation manner used by the network device needs to be consistent with a calculation manner used by the terminal device in order for the network device to receive the data sent by the terminal device.

The foregoing Formula (1) and Formula (3) are merely possible examples. During actual application, the terminal device or the network device may use another possible manner to calculate, based on an initial location to which the to-be-sent data is mapped, a quantity of symbols used to carry the to-be-sent data in a process of intra-sTTI and inter-sTTI frequency hopping, a frequency hopping group quantity in the process of intra-sTTI and inter-sTTI frequency hopping, a quantity of REBs that are within one symbol and that can be used to carry the to-be-sent data, and an offset in the process of intra-sTTI and inter-sTTI frequency hopping, the location of the transmission resource to which the to-be-sent data is mapped at each moment in the transmission process.

The process of intra-sTTI and inter-sTTI frequency hopping is described below by using an example.

Figure 6:
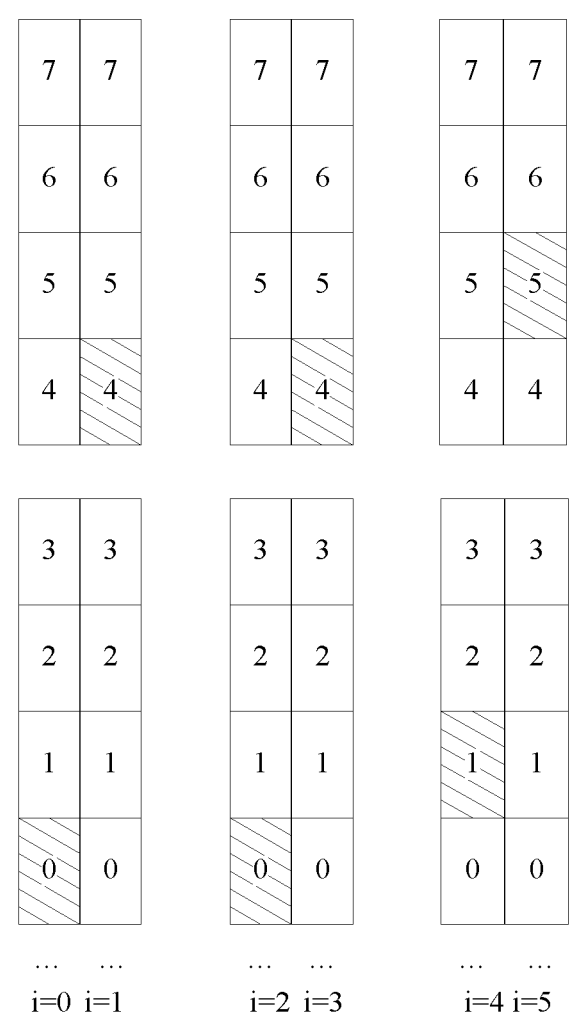

It is assumed that the network device notifies the terminal device by using high layer signaling that a pattern of intra-sTTI and inter-sTTI frequency hopping is to be used to perform resource mapping for data having the preset type, for example, data of a URLLC service, and notifies the terminal device that the initial location of performing resource mapping for the to-be-sent data is $\tilde{n}_{REB}=0$, the quantity of symbols used to carry the to-be-sent data in the process of intra-sTTI and inter-sTTI frequency hopping is $n_{HO}^{Symb}=2$, a total quantity of available REBs within one symbol is $N_{REB}^{Symb}=8$, the frequency hopping group quantity in the process of intra-sTTI and inter-sTTI frequency hopping is $n_{HO}^{REB}=2$, and the offset in the process of intra-sTTI and inter-sTTI frequency hopping is $\Delta n_f=1$. In this case, referring to FIG. 6, FIG. 6 is a schematic diagram of a pattern of intra-sTTI frequency hopping during resource mapping for uplink data. In FIG. 6, each column represents one symbol. Six columns are used as an example. Every two adjacent columns represent one sTTI. That is, in FIG. 6, three sTTIs are included. An sTTI on the left includes a zero[th] symbol (i=0) and a first symbol (i=1). An sTTI in the middle includes a second symbol (i=2) and a third symbol (i=3). An sTTI on the right includes a fourth symbol (i=4) and a fifth symbol (i=5). That is, the example in which one sTTI includes two symbols is still used in FIG. 6. Numbers in a symbol represent different locations of one symbol. A location with sloping lines is a location to which the to-be-sent data is mapped. For example, the initial location to which the to-be-sent data is mapped is a location 0 of the zero[th] symbol of the sTTI on the left. After frequency hopping is performed for the first time, the location of mapping changes to a location 4 of the first symbol of the sTTI on the left. That is, the first time of frequency hopping is intra-sTTI frequency hopping. After frequency hopping is performed for the second time, the location of mapping changes to a location 0 of the second symbol of the sTTI in the middle. That is, the second time of frequency hopping is inter-sTTI frequency hopping. After frequency hopping is performed for the third time, the location of mapping changes to a location 4 of the third symbol of the sTTI in the middle. That is, the third time of frequency hopping is inter-sTTI frequency hopping. After frequency hopping is performed for the fourth time, the location of mapping changes to a location 1 of the fourth symbol of the sTTI on the right. That is, the fourth time of frequency hopping is inter-sTTI frequency hopping. After frequency hopping is performed for the fifth time, the location of mapping changes to a location 5 of the fifth symbol of the sTTI on the right, and the like. By analogy, each location of mapping may be obtained based on Formula (1) and Formula (3).

Optionally, in FIG. 6, intra-sTTI frequency hopping is performed within each sTTI. During actual application, intra-sTTI frequency hopping may be not performed within some intra-sTTIs. For example, the initial location to which the to-be-sent data is mapped is a location 0 of a zero$^{th}$ symbol of the sTTI on the left. After frequency hopping is performed for the first time, the location of mapping may probably change to the second symbol or the third symbol of the sTTI in the middle. This is not limited in this embodiment of the present invention.

By using intra-sTTI and inter-sTTI frequency hopping, the frequency hopping pattern is more flexible, and an anti-interference capability can be improved.

3. sTTI Bundling Frequency Hopping.

In the sTTI bundling, a plurality of sTTIs are bundled. The plurality of sTTIs may be considered as one sTTI. The bundled sTTIs may be sTTIs that are continuous in time domain, or may be sTTIs that are discrete in time domain.

If the control signaling indicates that the frequency hopping pattern in the transmission process after the to-be-sent data is mapped to the transmission resource is sTTI bundling frequency hopping, the terminal device may calculate, based on an initial location to which the to-be-sent data is mapped, a quantity of symbols used to carry the to-be-sent data in a process of sTTI bundling frequency hopping, a frequency hopping group quantity in the process of sTTI bundling frequency hopping, a quantity of REBs that are within one symbol and that can be used to carry the to-be-sent data, and an offset in the process of sTTI bundling frequency hopping, the location of the transmission resource to which the to-be-sent data is mapped at each moment in the transmission process.

Optionally, the initial location to which the to-be-sent data is mapped may be indicated by the network device. For example, the network device may send the initial location to the terminal device by using high layer signaling. For example, possible high layer signaling may include Radio Resource Control (Radio Resource Control, RRC) signaling.

Optionally, the frequency hopping group quantity in the process of sTTI bundling frequency hopping may be related to a bandwidth, and may be understood as a quantity of groups involved in the process of sTTI bundling frequency hopping. For example, after the M frequency bands are allocated, all REBs included in the M frequency bands may be grouped into a plurality of groups. In this case, at least one group of REBs may be included within one sTTI. Each group may include one or more REBs. In the process of performing sTTI bundling frequency hopping, frequency hopping may be preferentially performed between different groups. In this way, a relatively large time domain gain and/or frequency domain gain can be obtained. In this way, at least one group is involved in the process of performing sTTI bundling frequency hopping. The at least one group means the frequency hopping group quantity in the process of sTTI bundling frequency hopping. For example, the calculating, by the terminal device based on an initial location to which the to-be-sent data is mapped, a quantity of sTTIs used to carry the to-be-sent data in a process of sTTI bundling frequency hopping, a frequency hopping group quantity in the process of sTTI bundling frequency hopping, a quantity of REBs that are within one symbol and that can be used to carry the to-be-sent data, and an offset in the process of sTTI bundling frequency hopping, the location of the transmission resource to which the to-be-sent data is mapped at each moment in the transmission process may be implemented by using the following Formula (1) and Formula (4):

$$n_{REB}(i) = (\tilde{n}_{REB} + f_{hop}(i)) \mod(N_{REB}^{Symb}) \quad (1)$$

$$f_{hop}(i) = \quad (4)$$
$$\begin{cases} 0, & \lfloor i/n_{Bundling}^{Symb} \rfloor = 0 \\ f_{hop}(i - n_{Bundling}^{Symb}) + \lfloor N_{REB}^{Symb}/n_{HO}^{REB} \rfloor, & 0 < \lfloor i/n_{Bundling}^{Symb} \rfloor < n_{HO}^{REB} \\ f_{hop}(i - n_{HO}^{REB} n_{Bundling}^{Symb}) + \Delta n_f, & \lfloor i/n_{Bundling}^{Symb} \rfloor \geq n_{HO}^{REB} \end{cases}$$

where mod denotes a modulo function, $\lfloor \ \rfloor$ may denote a rounding down operation, $n_{REB}(i)$ may denote a sequence number of an REB after frequency hopping is performed for the to-be-sent data in an $i^{th}$ symbol to which the to-be-sent data is mapped, $\tilde{n}_{REB}$ may denote a sequence number of a resource element block at the initial location to which the to-be-sent data is mapped, $N_{REB}^{Symb}$ may denote a total quantity of available REBs within one symbol, $n_{HO}^{REB}$ may denote the frequency hopping group quantity in the process of sTTI bundling frequency hopping, where $n_{HO}^{REB}$ may be related to a bandwidth, $n_{HO}^{REB}$ may also be referred to as a quantity of frequency hopping resources related to a bandwidth, for example, when the preset type is a URLLC type, $n_{HO}^{REB} = \lceil N_{RB}^{URLLC}/N_{IR} \rceil * N_{IR}^{Group}$, $\lceil \ \rceil$ denotes a rounding up operation, $N_{RB}^{URLLC}$ denotes a quantity of resource blocks (Resource Block, RB) occupied by a URLLC service, $N_{IR}$ denotes a quantity of RBs irrelevant to a frequency domain, for example, a typical value of $N_{IR}$ may be 50, $N_{IR}^{Group}$ denotes a quantity of groups included in the quantity of RBs irrelevant to the frequency domain, for example, a typical value of $N_{IR}^{Group}$ may be 2, $n_{Bundling}^{Symb}$ may denote a quantity of symbols used to carry the to-be-sent data in the process of sTTI bundling frequency hopping, $n_{Bundling}^{Symb}$ is an integer multiple of a quantity $n_{Symb}^{sTTI}$ of symbol included in an sTTI, $\Delta n_f$ may denote the offset in the process of sTTI bundling frequency hopping, and $f_{hop}(i)$ may denote an overall offset caused by the process of frequency hopping. In this case, $f_{hop}(i)$ may denote an overall offset caused by the process of intra-sTTI and inter-sTTI frequency hopping.

In practice, because the initial location is known and no longer needs to be calculated, Formula (1) and Formula (4) are used to calculate locations other than the initial location to which the to-be-sent data is mapped.

Optionally, for example, $\tilde{n}_{REB}$, $N_{REB}^{Symb}$, $n_{HO}^{REB}$, and $\Delta n_f$ may all be indicated by the network device, and for example, may be notified by the network device to the terminal device by using high layer signaling. Optionally, the network device may respectively send different parameters to the terminal device by using different high layer signaling, or may send the parameters to the terminal device by using one piece of high layer signaling. If the network device sends the parameters to the terminal device by using one piece of high layer signaling, the high layer signaling and the control signaling may be, for example, one same piece of signaling. That is, by using the control signaling, the network device may indicate the mapping mode of the to-be-sent data of the terminal device and at the same time may further send required parameters to the terminal device. Alternatively, the high layer signaling and the control signaling may be different signaling.

Certainly, both the terminal device and the network device need to calculate the location of the transmission resource to which the to-be-sent data is mapped at each moment in the transmission process, so that the to-be-sent data mapped to the transmission resource can be received relatively accurately.

Optionally, the network device may calculate, based on an initial location to which the to-be-sent data is mapped, a quantity of symbols used to carry the to-be-sent data in a process of sTTI bundling frequency hopping, a frequency hopping group quantity in the process of sTTI bundling frequency hopping, a quantity of REBs that are within one symbol and that can be used to carry the to-be-sent data, and an offset in the process of sTTI bundling frequency hopping, the location of the transmission resource to which the to-be-sent data is mapped at each moment in the transmission process.

In a possible implementation, the network device may similarly perform calculation based on Formula (1) and Formula (3). In general, a calculation manner used by the network device needs to be consistent with a calculation manner used by the terminal device in order for the network device to receive the data sent by the terminal device.

The foregoing Formula (1) and Formula (3) are merely possible examples. During actual application, the terminal device or the network device may use another possible manner to calculate, based on an initial location to which the to-be-sent data is mapped, a quantity of symbols used to carry the to-be-sent data in a process of sTTI bundling frequency hopping, a frequency hopping group quantity in the process of sTTI bundling frequency hopping, and an offset in the process of sTTI bundling frequency hopping, the location of the transmission resource to which the to-be-sent data is mapped at each moment in the transmission process.

The process of sTTI bundling frequency hopping is described below by using an example.

Figure 7:
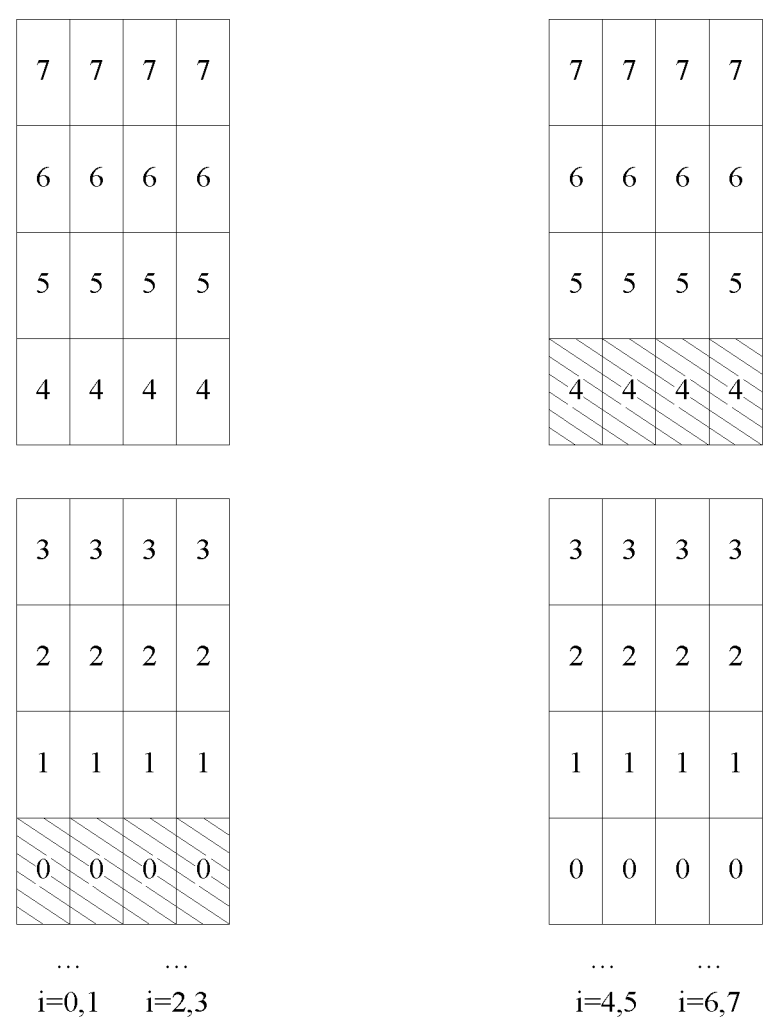

It is assumed that the network device notifies the terminal device by using high layer signaling that a pattern of sTTI bundling frequency hopping is to be used to perform resource mapping for data having the preset type, for example, data of a URLLC service, and notifies the terminal device that the initial location of performing resource mapping for the to-be-sent data is $\tilde{n}_{REB}=0$, the quantity of symbols used to carry the to-be-sent data in the process of sTTI bundling frequency hopping is $n_{Binding}^{Symb}=4$, a total quantity of available REBs within one symbol is $N_{REB}^{Symb}=8$, the frequency hopping group quantity in the process of sTTI bundling frequency hopping is $n_{HO}^{REB}=2$, and the offset in the process of sTTI bundling frequency hopping $\Delta n_f=1$. In this case, referring to FIG. 7, FIG. 7 is a schematic diagram of a pattern of intra-sTTI frequency hopping during resource mapping for uplink data. In FIG. 7, each column represents one symbol. Eight columns are used as an example. The four columns on the left represent two bundled sTTIs. Similarly, four columns on the right also represent two bundled sTTIs. That is, starting from the first column on the left, every two adjacent columns represent one sTTI. A total of four sTTIs are included in FIG. 7. For example, starting from the left, the four sTTIs are referred to as a first sTTI, a second sTTI, a third sTTI, and a fourth sTTI. i represents a sequence number of a symbol. For example, i=0 represents a zero$^{th}$ symbol, i=1 represents a first symbol, and the rest is deduced by analogy. In this embodiment, for example, the first sTTI and the second sTTI are bundled, and the third sTTI and the fourth sTTI are bundled. During resource mapping, the first sTTI and the second sTTI may be considered as one sTTI, and the third sTTI and the fourth sTTI may be considered as one sTTI. The to-be-sent data may be simultaneously mapped to two bundled sTTIs. Numbers in each symbol represent different locations of one symbol. The location with sloping lines in FIG. 7 is a location to which the to-be-sent data is mapped. For example, the initial locations to which the to-be-sent data is mapped are a location 0 of a zero$^{th}$ symbol and a location 0 of a first symbol that are included in the first sTTI, and a location 0 of the second symbol and a location 0 of the third symbol that are included in the second sTTI. After frequency hopping is performed for the first time, the locations of mapping change to a location 4 of the fourth symbol and a location 4 of the fifth symbol that are included in the third sTTI and a location 4 of the sixth symbol and a location 4 of the seventh symbol that are included in the fourth sTTI, and the like. The rest is deduced by analogy. Each location of mapping may be obtained based on Formula (1) and Formula (4).

When sTTI bundling frequency hopping is used, a plurality of sTTIs may be bundled to map a relatively large amount of data at a same time, so that a quantity of times of transmission can be reduced. The network device may obtain a relatively large amount of data by calculating a mapping location once, so that a quantity of times of calculation of the network device can be reduced, and load of the terminal device and the network device can be reduced.

The device provided in the embodiments of the present invention is described below with reference to the accompanying drawings.

Figure 8:
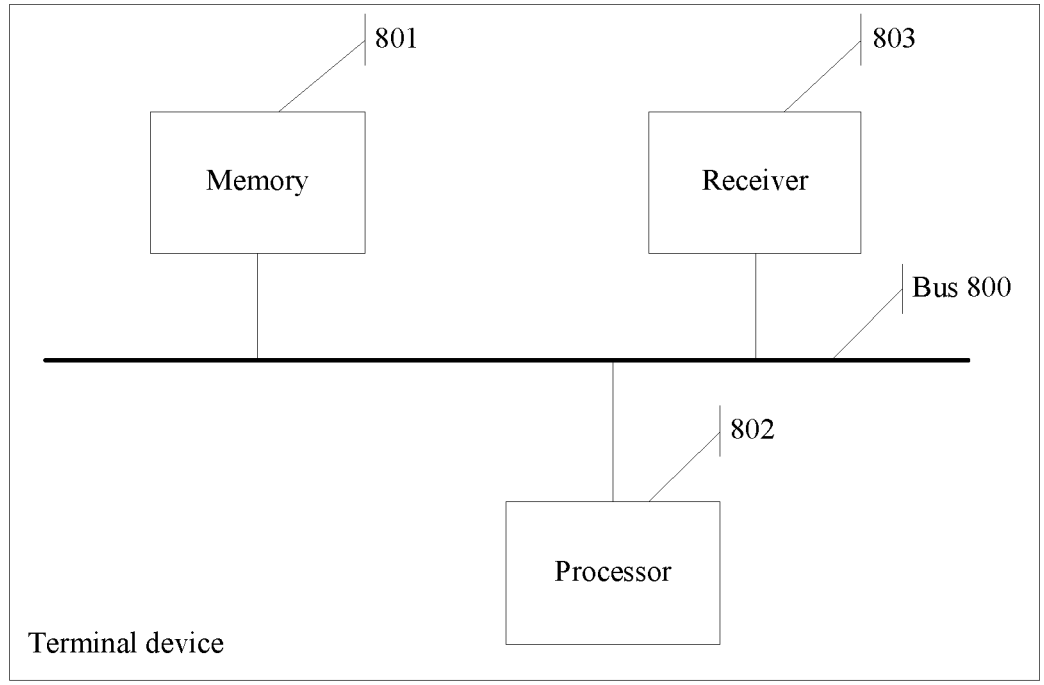
FIG. 8 is a possible schematic structural diagram of a terminal device according to an embodiment of the present invention.

Referring to FIG. 8, a terminal device is provided. The terminal device may include a memory 801, a processor 802, and a receiver 803.

For example, the processor 802 may include a central processing unit (CPU) or an application-specific integrated circuit (Application Specific Integrated Circuit, ASIC), may include one or more integrated circuits configured to control execution of programs, may include a hardware circuit developed by using a field programmable gate array (Field Programmable Gate Array, FPGA), and may include a baseband chip.

There may be one or more memories 801. The memory 801 may include a read only memory (Read Only Memory, ROM), a random access memory (Random Access Memory, RAM), a magnetic disk memory, and the like. The memory 801 may be configured to store an instruction required by the processor 802 to execute a task, and may further be configured to store data.

The receiver 803 may be a radio frequency system, and is configured to perform network communication with an external device. For example, the receiver 803 may perform communication with the external device by using a network such as an Ethernet, a radio access network, and a wireless local area network.

The memory 801 and the receiver 803 may be connected to the processor 802 by using a bus 800 (this is used as an example in FIG. 8), or may be connected to the processor 802 by using a dedicated connecting wire.

The processor 802 is designed and programmed, so that code corresponding to the method shown in the foregoing is built into a chip, enabling the chip to execute, when running, the method shown in the foregoing embodiments. How to design and program the processor 802 is a technology well known by persons skilled in the art. Details are no longer elaborated herein.

The terminal device may be configured to perform the method in the foregoing FIG. 2 and/or FIG. 3, and may be, for example, the foregoing terminal device. Therefore, for functions and the like implemented by the units in the terminal device, refer to the description of the foregoing method part, and details are not described.

Figure 9:
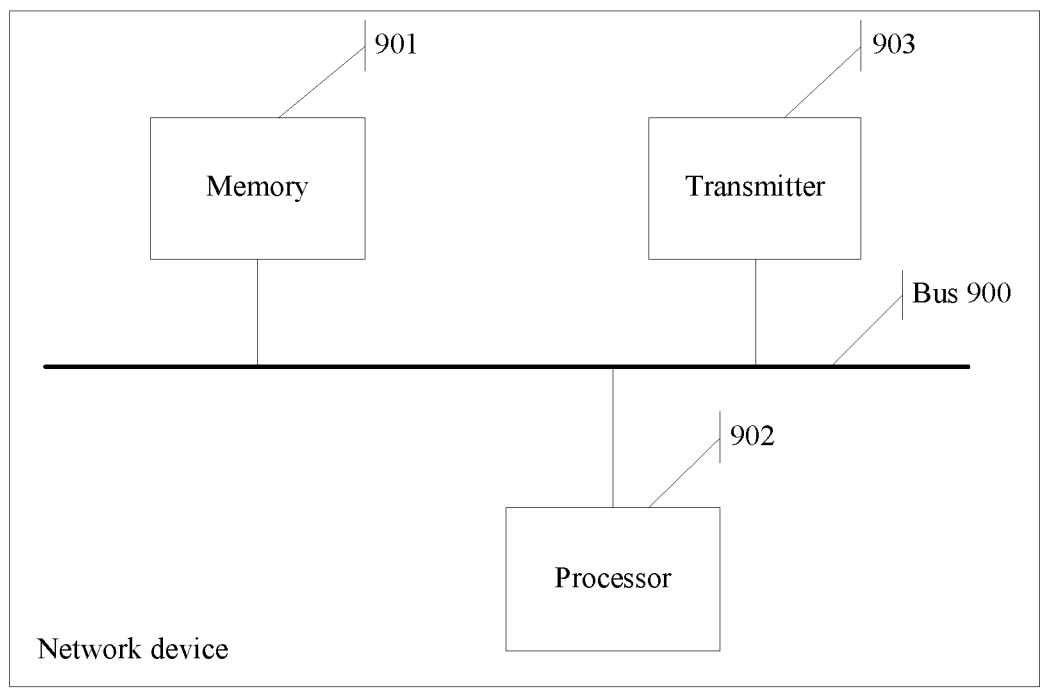
FIG. 9 is a possible schematic structural diagram of a network device according to an embodiment of the present invention.

Referring to FIG. 9, a network device is provided. The network device may include a memory 901, a processor 902, and a transmitter 903.

For example, the processor 902 may include a central processing unit (CPU) or an application-specific integrated circuit (Application Specific Integrated Circuit, ASIC), may include one or more integrated circuits configured to control execution of programs, may include a hardware circuit developed by using a field programmable gate array (Field Programmable Gate Array, FPGA), and may include a baseband chip.

There may be one or more memories 901. The memory 901 may include a read only memory (Read Only Memory, ROM), a random access memory (Random Access Memory, RAM), a magnetic disk memory, and the like. The memory 901 may be configured to store an instruction required by the processor 902 to execute a task, and may further be configured to store data.

The transmitter 903 may be a radio frequency system, and is configured to perform network communication with an external device. For example, the transmitter 903 may perform communication with the external device by using a network such as an Ethernet, a radio access network, and a wireless local area network.

The memory 901 and the transmitter 903 may be connected to the processor 902 by using a bus 900 (this is used as an example in FIG. 9), or may be connected to the processor 902 by using a dedicated connecting wire.

The processor 902 is designed and programmed, so that code corresponding to the method shown in the foregoing is built into a chip, enabling the chip to execute, when running, the method shown in the foregoing embodiments. How to design and program the processor 902 is a technology well known by persons skilled in the art. Details are no longer elaborated herein.

The network device may be configured to perform the method in the foregoing FIG. 2 and/or FIG. 3, and may be, for example, the foregoing network device. Therefore, for functions and the like implemented by the units in the network device, refer to the description of the foregoing method part, and details are not described.

Figure 10:
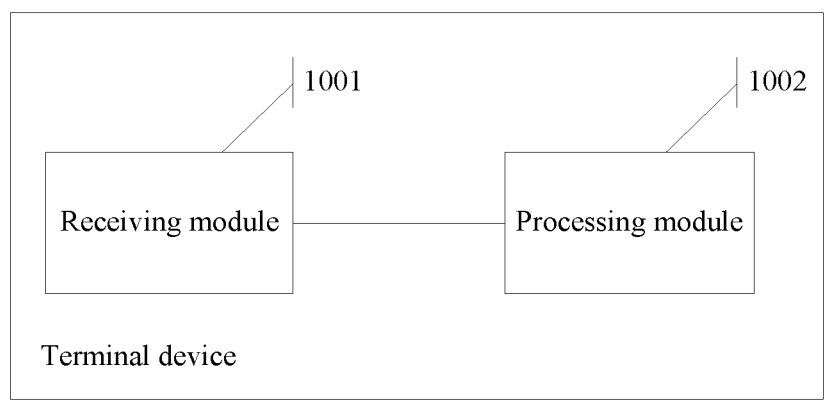
FIG. 10 is a possible structural block diagram of a terminal device according to an embodiment of the present invention.

Referring to FIG. 10, another terminal device is provided. The terminal device may include a receiving module 1001 and a processing module 1002.

During actual application, a physical device corresponding to the receiving module 1001 may be the receiver 803 in FIG. 8, and a physical device corresponding to the processing module 1002 may be the processor 802 in FIG. 8.

The terminal device may be configured to perform the method in the foregoing FIG. 2 and/or FIG. 3, and may be, for example, the foregoing terminal device. Therefore, for functions and the like implemented by the units in the terminal device, refer to the description of the foregoing method part, and details are not described.

Figure 11:
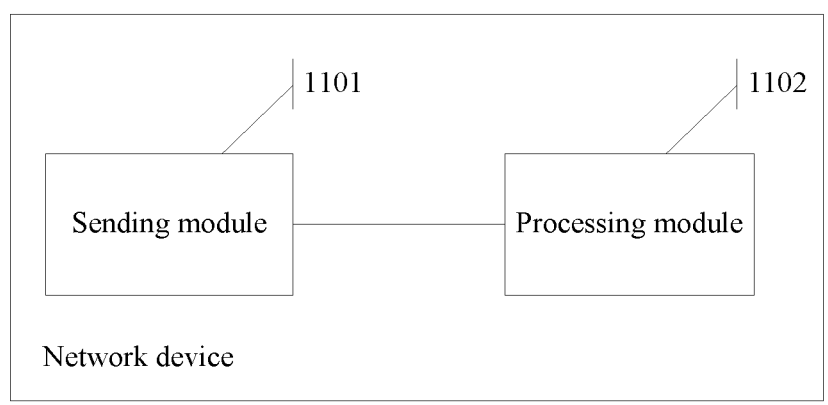
FIG. 11 is a possible structural block diagram of a network device according to an embodiment of the present invention.

Referring to FIG. 11, another network device is provided. The network device may include a sending module 1101 and a processing module 1102.

During actual application, a physical device corresponding to the sending module 1101 may be the transmitter 903 in FIG. 9, and a physical device corresponding to the processing module 1102 may be the processor 902 in FIG. 9.

The network device may be configured to perform the method in the foregoing FIG. 2 and/or FIG. 3, and may be, for example, the foregoing network device. Therefore, for functions and the like implemented by the units in the network device, refer to the description of the foregoing method part, and details are not described.

Optionally, an embodiment of the present invention further provides a computer storage medium. The computer storage medium may store a program, and when the program is executed, some or all steps in any transmission resource mapping method recorded in the foregoing embodiments are performed.

The embodiments of the present invention provide a new transmission resource mapping mode. In this mapping mode, the terminal device may perform mapping based on the control signaling sent by the network device, the minimum unit for mapping is the resource element block, and the length of the resource element block in time domain is less than the length of the physical resource block in time domain. In this way, a granularity is relatively small during mapping, latency in the transmission process can be effectively reduced, and this mapping mode is totally applicable to a service that has a relatively high latency requirement.

In addition, the resource element block is used as the minimum unit to perform mapping, and the resource element block is also used as the minimum unit to perform frequency hopping during frequency hopping, so that a granularity of frequency hopping is reduced, and an anti-interference capability during transmission can be improved, that is, a transmission reliability is improved.

In the present invention, it should be understood that the disclosed device and method may be implemented in other manners. For example, the described apparatus embodiment is merely an example. For example, the unit or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

An embodiment of the present invention further provides a computer storage medium. The computer storage medium may store a program, and when the program is executed, some or all steps in any ranging method recorded in the foregoing method embodiments are performed.

The functional units in the embodiments of the present invention may be integrated in one processing unit, or the units may be independent physical modules.

When the integrated unit is implemented in the form of a software functional unit and sold or used as an independent product, the integrated unit may be stored in a computer-readable storage medium. Based on such an understanding, all or a part of technical solutions of the present invention may be implemented in a form of a software product. The computer software product is stored in a storage medium and includes several instructions for instructing a computer device, such as a personal computer, a server, a network device, or a processor (processor) to perform all or a part of the steps of the methods described in the embodiments of the present invention. The foregoing storage medium includes various media such as a universal serial bus flash drive (Universal Serial Bus flash drive), a mobile hard disk, a ROM, a RAM, magnetic disk or an optical disc that can store program code.

The foregoing embodiments are merely used to describe the technical solutions of the present invention in detail. The foregoing embodiments are merely intended to help understand the method of the embodiments of the present invention, and shall not be construed as a limitation on the embodiments of the present invention. Variations or replacements that may be easily conceived of by persons skilled in the art shall all fall within the protection scope of the present invention.

What is claimed is:

1. A terminal device, comprising:
   a receiver configured to receive control signaling from a network device, the control signaling indicating a mapping mode to be used by the terminal device to map to-be-sent data to a transmission resource, the mapping mode comprising that a minimum unit for mapping the to-be-sent data is a resource element block and a frequency hopping pattern in a transmission process after the to-be-sent data is mapped to the transmission resource, and a length of the resource element block in time domain being less than a length of a physical resource block in the time domain; and
   a processor couple to the receiver and configured to map the to-be-sent data to the transmission resource based on an indication of the control signaling using the resource element block as a unit.

2. The terminal device of claim 1, wherein the processor is further configured to:
   calculate, based on the indication of the control signaling, a location of a transmission resource to which the to-be-sent data is mapped at each moment in the transmission process; and
   map, based on the calculated location of the transmission resource and by using the resource element block as the unit, the to-be-sent data to the transmission resource.

3. The terminal device of claim 2, wherein in a manner of calculating the location of the transmission resource to which the to-be-sent data is mapped at each moment in the transmission process, when the control signaling indicates that the frequency hopping pattern in the transmission process after the to-be-sent data is mapped to the transmission resource is intra-short transmission time interval frequency hopping, the processor is further configured to calculate, based on an initial location to which the to-be-sent data is mapped, a quantity of resource element blocks within one symbol that can be used to carry the to-be-sent data, a frequency hopping group quantity in a process of intra-short transmission time interval frequency hopping, and an offset in the process of intra-short transmission time interval frequency hopping, the location of the transmission resource to which the to-be-sent data is mapped at each moment in the transmission process.

4. The terminal device of claim 2, wherein in a manner of calculating the location of the transmission resource to which the to-be-sent data is mapped at each moment in the transmission process, when the control signaling indicates that the frequency hopping pattern in the transmission process after the to-be-sent data is mapped to the transmission resource is intra-short transmission time interval and inter-short transmission time interval frequency hopping, the processor is further configured to calculate, based on an initial location to which the to-be-sent data is mapped, a quantity of resource element blocks within one symbol that can be used to carry the to-be-sent data, a quantity of symbols used to carry the to-be-sent data in a process of intra-short transmission time interval and inter-short transmission time interval frequency hopping, a frequency hopping group quantity in the process of intra-short transmission time interval and inter-short transmission time interval frequency hopping, and an offset in the process of intra-short transmission time interval and inter-short transmission time interval frequency hopping, the location of the transmission resource to which the to-be-sent data is mapped at each moment in the transmission process.

5. The terminal device of claim 2, wherein in a manner of calculating the location of the transmission resource to which the to-be-sent data is mapped at each moment in the transmission process, when the control signaling indicates that the frequency hopping pattern in the transmission process after the to-be-sent data is mapped to the transmission resource is short transmission time interval bundling frequency hopping, the processor is further configured to calculate, based on an initial location to which the to-be-sent data is mapped, a quantity of resource element blocks within one symbol that can be used to carry the to-be-sent data, a quantity of symbols used to carry the to-be-sent data in a process of short transmission time interval bundling frequency hopping, a frequency hopping group quantity in the process of short transmission time interval bundling frequency hopping, and an offset in the process of short transmission time interval bundling frequency hopping, the location of the transmission resource to which the to-be-sent data is mapped at each moment in the transmission process.

6. The terminal device of claim 2, wherein M frequency bands are allocated in advance in an uplink transmission resource of the terminal device, the resource element block being used as the minimum unit for mapping data whose type is a preset type in the M frequency bands, the M being a positive integer, and in a manner of mapping the to-be-sent data to the transmission resource, the processor being further configured to map the to-be-sent data to a transmission resource of at least one of the M frequency bands based on the calculated location of the transmission resource and using the resource element block as the unit.

7. A network device, comprising:
   a transmitter configured to send control signaling to a terminal device, the control signaling indicating a mapping mode to be used by the terminal device to map to-be-sent data to a transmission resource, the mapping mode comprising that a minimum unit for mapping the to-be-sent data is a resource element block and a frequency hopping pattern in a transmission process after the to-be-sent data is mapped to the transmission resource, and a length of the resource element block in time domain being less than a length of a physical resource block in the time domain; and
   a processor coupled to the transmitter and configured to receive, based on an indication of the control signaling and using the resource element block as a unit, the to-be-sent data mapped to the transmission resource.

8. The network device of claim 7, wherein the processor is further configured to:
   calculate, based on the indication of the control signaling, a location of the transmission resource to which the to-be-sent data is mapped at each moment in the transmission process; and receive, based on the calculated location of the transmission resource and using the resource element block as the unit, the to-be-sent data mapped to the transmission resource.

9. The network device of claim 8, wherein in a manner of calculating the location of the transmission resource to which the to-be-sent data is mapped at each moment in the transmission process, when the control signaling indicates that the frequency hopping pattern in the transmission process after the to-be-sent data is mapped to the transmission resource is intra-short transmission time interval frequency hopping, the processor is further configured to calculate, based on an initial location to which the to-be-sent data is mapped, a quantity of resource element blocks within one symbol that can be used to carry the to-be-sent data, a frequency hopping group quantity in a process of intra-short transmission time interval frequency hopping, and an offset in the process of intra-short transmission time interval frequency hopping, the location of the transmission resource to which the to-be-sent data is mapped at each moment in the transmission process.

10. The network device of claim 8, wherein in a manner of calculating the location of the transmission resource to which the to-be-sent data is mapped at each moment in the transmission process, when the control signaling indicates that the frequency hopping pattern in the transmission process after the to-be-sent data is mapped to the transmission resource is intra-short transmission time interval and inter-short transmission time interval frequency hopping, the processor is further configured to calculate, based on an initial location to which the to-be-sent data is mapped, a quantity of resource element blocks within one symbol that can be used to carry the to-be-sent data, a quantity of symbols used to carry the to-be-sent data in a process of intra-short transmission time interval and inter-short transmission time interval frequency hopping, a frequency hopping group quantity in the process of intra-short transmission time interval and inter-short transmission time interval frequency hopping, and an offset in the process of intra-short transmission time interval and inter-short transmission time interval frequency hopping, the location of the transmission resource to which the to-be-sent data is mapped at each moment in the transmission process.

11. The network device of claim 8, wherein in a manner of calculating the location of the transmission resource to which the to-be-sent data is mapped at each moment in the transmission process, when the control signaling indicates that the frequency hopping pattern in the transmission process after the to-be-sent data is mapped to the transmission resource is short transmission time interval bundling frequency hopping, the processor is further configured to calculate, based on an initial location to which the to-be-sent data is mapped, a quantity of resource element blocks within one symbol that can be used to carry the to-be-sent data, a quantity of symbols used to carry the to-be-sent data in a process of short transmission time interval bundling frequency hopping, a frequency hopping group quantity in the process of short transmission time interval bundling frequency hopping, and an offset in the process of short transmission time interval bundling frequency hopping, the location of the transmission resource to which the to-be-sent data is mapped at each moment in the transmission process.

12. The network device of claim 8, wherein M frequency bands are allocated in advance in an uplink transmission resource of the terminal device, the resource element block is being used as the minimum unit for mapping data whose type is a preset type in the M frequency bands, the M being a positive integer, and in a manner of receiving the to-be-sent data mapped to the transmission resource, the processor being further configured to receive, based on the calculated location of the transmission resource and using the resource element block as the unit, the to-be-sent data mapped to a transmission resource of at least one of the M frequency bands.

13. A computer program product comprising a non-transitory computer readable storage medium storing program code thereon for transmission resource mapping, the program code comprising instructions for executing a method that comprises:
receiving control signaling from a network device, the control signaling indicating a mapping mode to be used by the terminal device to map to-be-sent data to a transmission resource, the mapping mode comprising that a minimum unit for mapping the to-be-sent data is a resource element block and a frequency hopping pattern in a transmission process after the to-be-sent data is mapped to the transmission resource, and a length of the resource element block in time domain being less than a length of a physical resource block in the time domain; and
mapping the to-be-sent data to the transmission resource based on an indication of the control signaling using the resource element block as a unit.

14. The computer program product of claim 13, wherein the method further comprises:
calculating, based on the indication of the control signaling, a location of a transmission resource to which the to-be-sent data is mapped at each moment in the transmission process; and
mapping, based on the calculated location of the transmission resource and using the resource element block as the unit, the to-be-sent data to the transmission resource.

15. The computer program product of claim 14, wherein in a manner of calculating the location of the transmission resource to which the to-be-sent data is mapped at each moment in the transmission process, when the control signaling indicates that the frequency hopping pattern in the transmission process after the to-be-sent data is mapped to the transmission resource is intra-short transmission time interval frequency hopping, the method further comprises calculating, based on an initial location to which the to-be-sent data is mapped, a quantity of resource element blocks within one symbol that can be used to carry the to-be-sent data, a frequency hopping group quantity in a process of intra-short transmission time interval frequency hopping, and an offset in the process of intra-short transmission time interval frequency hopping, the location of the transmission resource to which the to-be-sent data is mapped at each moment in the transmission process.

16. The computer program product of claim 14, wherein in a manner of calculating the location of the transmission resource to which the to-be-sent data is mapped at each moment in the transmission process, when the control signaling indicates that the frequency hopping pattern in the transmission process after the to-be-sent data is mapped to the transmission resource is intra-short transmission time interval and inter-short transmission time interval frequency hopping, the method further comprises calculating, based on an initial location to which the to-be-sent data is mapped, a quantity of resource element blocks within one symbol that can be used to carry the to-be-sent data, a quantity of symbols used to carry the to-be-sent data in a process of intra-short transmission time interval and inter-short transmission time interval frequency hopping, a frequency hopping group quantity in the process of intra-short transmission time interval and inter-short transmission time interval frequency hopping, and an offset in the process of intra-short transmission time interval and inter-short transmission time interval frequency hopping, the location of the transmission resource to which the to-be-sent data is mapped at each moment in the transmission process.

17. The computer program product of claim 14, wherein in a manner of calculating the location of the transmission resource to which the to-be-sent data is mapped at each moment in the transmission process, when the control signaling indicates that the frequency hopping pattern in the transmission process after the to-be-sent data is mapped to the transmission resource is short transmission time interval bundling frequency hopping, the method further comprises calculating, based on an initial location to which the to-be-sent data is mapped, a quantity of resource element blocks within one symbol that can be used to carry the to-be-sent data, a quantity of symbols used to carry the to-be-sent data in a process of short transmission time interval bundling frequency hopping, a frequency hopping group quantity in the process of short transmission time interval bundling frequency hopping, and an offset in the process of short transmission time interval bundling frequency hopping, the location of the transmission resource to which the to-be-sent data is mapped at each moment in the transmission process.

18. The computer program product of claim 14, wherein M frequency bands are allocated in advance in an uplink transmission resource of the terminal device, the resource element block being used as the minimum unit for mapping data whose type is a preset type in the M frequency bands, the M being a positive integer, and in a manner of mapping the to-be-sent data to the transmission resource, the method further comprises mapping the to-be-sent data to a transmission resource of at least one of the M frequency bands based on the calculated location of the transmission resource and using the resource element block as the unit.

* * * * *

UNITED STATES PATENT AND TRADEMARK OFFICE
CERTIFICATE OF CORRECTION

PATENT NO. : 10,681,692 B2
APPLICATION NO. : 16/301322
DATED : June 9, 2020
INVENTOR(S) : Xiaodong Sun et al.

Page 1 of 1

It is certified that error appears in the above-identified patent and that said Letters Patent is hereby corrected as shown below:

In the Claims

Claim 12, Column 31, Line 66: "is being used as" should read "being used as"

Signed and Sealed this
Eighteenth Day of August, 2020

Andrei Iancu
*Director of the United States Patent and Trademark Office*